United States Patent
LeBeau et al.

(10) Patent No.: US 10,909,199 B2
(45) Date of Patent: *Feb. 2, 2021

(54) AUTOMATIC ROUTING USING SEARCH RESULTS

(71) Applicant: Google LLC, Mountain View, CA (US)

(72) Inventors: Michael J. LeBeau, New York, NY (US); John Nicholas Jitkoff, Palo Alto, CA (US); William J. Byrne, Davis, CA (US)

(73) Assignee: Google LLC, Mountain View, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 15/427,431

(22) Filed: Feb. 8, 2017

(65) Prior Publication Data

US 2017/0147589 A1 May 25, 2017

Related U.S. Application Data

(63) Continuation of application No. 14/259,241, filed on Apr. 23, 2014, now abandoned, which is a
(Continued)

(51) Int. Cl.
*G06F 16/9537* (2019.01)
*G06F 16/951* (2019.01)
(Continued)

(52) U.S. Cl.
CPC .... *G06F 16/9537* (2019.01); *G06F 16/24578* (2019.01); *G06F 16/951* (2019.01);
(Continued)

(58) Field of Classification Search
None
See application file for complete search history.

(56) References Cited

U.S. PATENT DOCUMENTS 6,138,100 A 10/2000 Dutton et al.
6,311,182 B1 10/2001 Colbath et al.
(Continued)

FOREIGN PATENT DOCUMENTS

CN 101099152 1/2008
DE 10 2006 043 203 3/2008
(Continued)

OTHER PUBLICATIONS

Makayama. "Voice Dial for iPhone." [Retrieved on May 27, 2010] Retrieved from the Internet <URL: ht1,1J://makavarna.conJinhonevoicedial.hnnl> (3 pages).
(Continued)

*Primary Examiner* — Kim T Nguyen
(74) *Attorney, Agent, or Firm* — Honigman LLP; Brett A. Krueger; Grant Griffith

(57) ABSTRACT

In general, the subject matter described in this specification can be embodied in methods, systems, and program products for providing search results automatically to a user of a computing device. A spoken input provided by a user to a computing device is received. The spoken input is transmitted to a computer server system that is remote from the computing device. Search result information that is responsive to the spoken input is receiving by the computing device and in response to the transmitted spoken input. An alert is provided to the user that the device will connect the user to a target of the search result information if the user does not intervene to stop the connecting of the user. The user is connected to the target of the search result information based on a determination that the user has not intervened to stop the connecting of the user.

20 Claims, 11 Drawing Sheets

Related U.S. Application Data continuation of application No. 13/784,690, filed on Mar. 4, 2013, now Pat. No. 8,719,281, which is a continuation of application No. 12/852,221, filed on Aug. 6, 2010, now Pat. No. 8,392,411.

(60) Provisional application No. 61/346,893, filed on May 20, 2010.

(51) Int. Cl.
| | | |
|---|---|---|
| *G06F 16/2457* | (2019.01) | |
| *H04M 3/493* | (2006.01) | |
| *G06F 16/957* | (2019.01) | |
| *G06F 16/953* | (2019.01) | |
| *H04M 1/725* | (2006.01) | |
| *G10L 15/25* | (2013.01) | |

(52) U.S. Cl.
CPC .......... *G06F 16/953* (2019.01); *G06F 16/957* (2019.01); *H04M 1/72561* (2013.01); *H04M 3/4931* (2013.01); *H04M 3/4935* (2013.01); *G10L 15/25* (2013.01); *H04M 2201/40* (2013.01); *H04M 2242/15* (2013.01)

(56) References Cited

U.S. PATENT DOCUMENTS

| | | | |
|---|---|---|---|
| 6,671,354 B2 | 12/2003 | Mahoney | |
| 6,678,680 B1* | 1/2004 | Woo | G06F 16/683 |
| 7,451,081 B1 | 11/2008 | Gajic et al. | |
| 7,702,508 B2 | 4/2010 | Bennett | |
| 7,809,578 B2 | 10/2010 | Vitkainen et al. | |
| 7,965,801 B1* | 6/2011 | O'Reilly | H04L 7/0338 |
| | | | 375/340 |
| 8,630,860 B1* | 1/2014 | Zhang | G10L 15/26 |
| | | | 704/275 |
| 9,099,092 B2* | 8/2015 | Zhang | G10L 15/18 |
| 10,032,454 B2* | 7/2018 | Zhang | G10L 15/18 |
| 2002/0082832 A1 | 6/2002 | Nagashima | |
| 2002/0137470 A1 | 9/2002 | Baron et al. | |
| 2002/0143548 A1 | 10/2002 | Koran et al. | |
| 2003/0023724 A1 | 1/2003 | Martin et al. | |
| 2003/0078972 A1 | 4/2003 | Tapissier et al. | |
| 2004/0030689 A1 | 2/2004 | Anderson et al. | |
| 2004/0097224 A1 | 5/2004 | Lim | |
| 2004/0151300 A1 | 8/2004 | Manvell et al. | |
| 2004/0193403 A1 | 9/2004 | Creamer et al. | |
| 2004/0230572 A1 | 11/2004 | Omoigui | |
| 2004/0263340 A1 | 12/2004 | Pearson | |
| 2005/0171933 A1 | 8/2005 | Stepanich et al. | |
| 2005/0207560 A1* | 9/2005 | Speight | H04M 3/4935 |
| | | | 379/266.07 |
| 2005/0272473 A1 | 12/2005 | Sheena | |
| 2006/0178932 A1 | 8/2006 | Lang | |
| 2007/0083408 A1 | 4/2007 | Altberg et al. | |
| 2007/0111711 A1 | 5/2007 | Ratnakar | |
| 2007/0118520 A1 | 5/2007 | Bliss et al. | |
| 2007/0143309 A1 | 6/2007 | Malik | |
| 2007/0162542 A1* | 7/2007 | Lawrence | G06Q 30/02 |
| | | | 709/203 |
| 2007/0208564 A1 | 9/2007 | Tran | |
| 2008/0010604 A1 | 1/2008 | Suito et al. | |
| 2008/0071544 A1 | 3/2008 | Beaufays et al. | |
| 2008/0140416 A1* | 6/2008 | Shostak | H04W 4/04 |
| | | | 704/270.1 |
| 2009/0036093 A1 | 2/2009 | Graham et al. | |
| 2009/0077100 A1 | 3/2009 | Hancock et al. | |
| 2009/0102796 A1 | 4/2009 | Harris | |
| 2009/0144823 A1 | 6/2009 | Lamastra et al. | |
| 2010/0144335 A1 | 6/2010 | Rotbart et al. | |
| 2010/0150330 A1 | 6/2010 | Perry et al. | |
| 2010/0318486 A1 | 12/2010 | Stafford et al. | |
| 2011/0083167 A1 | 4/2011 | Carpenter et al. | |
| 2011/0144973 A1 | 6/2011 | Bocchieri et al. | |
| 2012/0032945 A1 | 2/2012 | Dare et al. | |
| 2014/0129220 A1* | 5/2014 | Zhang | G10L 15/18 |
| | | | 704/235 |
| 2015/0294669 A1* | 10/2015 | Zhang | G06F 16/9535 |
| | | | 704/235 |

FOREIGN PATENT DOCUMENTS

| | | |
|---|---|---|
| KR | 10-2007-0086012 | 8/2007 |
| KR | 10-2008-0031696 | 4/2008 |
| WO | 2006/053167 | 5/2006 |
| WO | 2008/034111 | 3/2008 |

OTHER PUBLICATIONS

Wikipedia. "GOOG-411." [Retrieved on May 27, 2010] Retrieved from the Internet <URL: hltD1/en.wikinedia.ordwiki/GOOCi 4J 1> (3 pages).

Wikipedia. "Google Maps." [Retrieved on May 27, 2010] Retrieved from the Internet <URL: httn://en.,vikinedia.orf!/v,-iki/Goode !fans> (10 pages).

Wang et al., Introduction to Voice Search, May 2008, IEEE Signal Processing Magazine, pp. 1-10.

Bai et al., Intelligent Retrieval of Dynamic Networked Information from Mobile Terminals Using Spoken Natural Language Queries, Feb. 1998, IEEE Transactions on Consumer Electronics, vol. 44, No. I, pp. 62-72.

Schalk$_{v,y}$k et al., Google Search by Voice: A Case Study, Feb. 2010, Google, Inc., pp. 1-35.

Digalakis et al., Quantization of Cepstral Parameters for Speech Recognition over the World Wide Web, Jan. 1999, IEEE Journal on Selected Areas in Communications, vol. 17, No. I, pp. 82-90.

Franz et al., Searching the Web by Voice, Jun. 2002, pp. 1-5.

International Search Report & Written Opinion for Application No. PCT/US2011/037346, dated Jul. 27, 2011, 11 pages.

Australian Office Action for Australian Application No. 2011255265, received Oct. 16, 2013. (3 pages).

Korean Office Action in Korean Application No. 10-2012-7033288, dated Jul. 27, 2014, 13 pages (with English translation).

* cited by examiner

AUTOMATIC ROUTING USING SEARCH RESULTS

CROSS-REFERENCE TO RELATED APPLICATIONS

This application is a continuation of and claims priority to U.S. patent application Ser. No. 14/259,241, filed on Apr. 23, 2014, entitled "Automatic Dialing Using Search Results," which claims priority to U.S. patent application Ser. No. 13/784,690, filed on Mar. 4, 2013, entitled "Automatic Dialing of Search Results," which claims priority to U.S. patent application Ser. No. 12/852,221, filed on Aug. 6, 2010, entitled "Automatic Routing of Search Results," which in turn claims priority to U.S. Provisional Application Ser. No. 61/346,893, filed on May 20, 2010, entitled "Automatic Dialing of Search Results," the entire contents of which are hereby incorporated by reference.

This application is a continuation of U.S. patent application Ser. No. 12/852,221, filed Aug. 6, 2010, titled "Automatic Routing Using Search Results," which claims priority from U.S. Provisional Application Ser. No. 61/346,893, filed on May 20, 2010, entitled "Automatic Dialing of Search Results." The entire contents of the prior applications are hereby incorporated by reference.

TECHNICAL FIELD

This document generally describes techniques, methods, systems, and mechanisms for automatically handling special search results, such as by automatically calling telephone numbers relating to internet search results or by automatically directing a user to a web page that is the target of a search result.

BACKGROUND

A mobile computing device, for example, an application telephone, may establish data communication with voice networks and with server systems that are connected to the mobile computing device via the internet. The mobile computing device can submit search queries to a search engine over the internet, and receive in response search results. In some instances, the search results can be selected by the search engine based on a location of the mobile computing device.

A user of the mobile computing device may also user the device to dial a telephone service over the Public Switched Telephone Network (PSTN) that provides a speech recognition-based business directory search. For example, the user may verbally submit a voice query to the telephone service using the mobile computing device, and may verbally hear a search result in response. The telephone service may connect the user to a telephone number for a search result if the user does not provide a verbal indication that the user would like to hear additional search results.

SUMMARY

The present disclosure generally relates to automatically handling special types of search results, such as by automatically calling telephone numbers relating to certain internet search results (e.g., those directed to particular businesses) or by automatically directing a user's browser to a web page that corresponds to a search result (e.g., when the result is very highly correlated to a search query from a user).

In other words, this document describes techniques, methods, systems, and mechanisms for automatically handling certain types of search results, including by calling telephone numbers relating to internet search results or automatically directing a web browser to a web page for a particular result. In general, a user of a computing device may input a query (e.g., a voice query or a textual query) using the computing device, and may submit the query to a search engine system in a familiar manner. The search engine system may receive the query, identify a geographical location of interest (e.g., an estimated geographical location of the computing device or a location specified in the query) or a web page or pages, and may provide to the computing device a local search result in the form of a telephone number or one or more results that correspond to landing web pages for the results.

The computing device may initiate a call using the returned telephone number automatically by displaying information about the organization to be called and providing a warning that the number will be dialed automatically if the user does not manually intervene. Where the most relevant result is determined to be a web page, the device may similarly automatically direct the user's browser or other web viewing application to the page. In either instance, the device may delay for a period while indicating to the user that it is going to make the call or go to the page automatically if the user does not intervene by the end of a countdown period, and may also give the user a control to select (or phrase to speak) to prevent such automatic redirection of the user.

In general, one aspect of the subject matter described in this specification can be embodied in a computer-implemented method for automatic telephone calling. The method includes receiving a query at a server system and from a computing device that is remote from the server system. The method includes determining whether the query is for causing the remote computing device to call a telephone number automatically. The method includes providing the query to a particular search engine system. The method includes receiving from a particular search engine system one or more search results that are responsive to the received query. The method includes providing a particular telephone number that corresponds to a most prominently ranked of the one or more search results from the search engine system and to the remote computing device, so as to cause the remote computing device to call the particular telephone number automatically.

Another aspect of the subject matter described in this specification can be embodied in a computer-implemented method for automatic telephone calling. The method includes providing a query by a computing device and to a server system that is remote from the computing device, so as to cause the remote server system to receive from a search engine system one or more search results that are responsive to the received query. The method includes receiving from the server system a telephone number that corresponds to a most prominently ranked of the one or more search results. The method includes in response to receiving the telephone number, automatically calling the telephone number. Automatically calling the telephone number includes presenting on the computing device a description of the most prominently ranked search result.

In yet another aspect of the subject matter described in this specification, a system for automatic telephone calling includes a query handler, at a computing device, programmed to receive user-input selecting a graphical interface element that is for transmitting a user-input query to a server system that is remote to the computing device, and to transmit the user-input query to the server system in response to receiving the user-input. The system includes a location identifier, at the server system, programmed to identify a location that is provided to the server system in or with the query. The system includes a particular search engine, at the server system, programmed to receive the query and determine search results that are relevant to the query and are geographically-constrained based on the location, wherein the search results are ranked. The system includes an automatic caller programmed to receive a telephone number for a most-prominently ranked of the search results, and automatically call the telephone number without receiving user-input subsequent to the transmission of the user-input query to the server system.

Another aspect of the subject matter described in this specification may be embodied in a computer-implemented method of providing search results automatically to a user of a computing device. The method includes receiving a spoken input provided by a user to a computing device. The method includes transmitting the spoken input to a computer server system that is remote from the computing device. The method includes receiving by the computing device and in response to the transmitted spoken input, search result information that is responsive to the spoken input. The method includes providing an alert to the user, by the computing device, that the device will connect the user to a target of the search result information if the user does not intervene to stop the connecting of the user. The method includes connecting the user to the target of the search result information based on a determination that the user has not intervened to stop the connecting of the user.

These and other implementations can optionally include one or more of the following features. The received query may include recorded voice information. The voice information may be converted, by the server system, into textual form such that the query that is provided to the particular search engine system is in textual form. The particular search engine system may be a geographical search engine system that receives (i) a query, and (ii) a location, and returns a geographically-constrained listing of search results that correspond to venues that are responsive to the query and are geographically near the location. The location may be an estimated geographical location of the remote computing device as determined by the remote computing device using information encoded in wireless signals that identifies one or more remote transmitting devices.

Determining whether the query is for causing the remote computing device to call a telephone number automatically may include determining whether the query includes a predefined carrier phrase. Providing the query to the particular search engine system may be performed in response to a determination that the query includes the predefined carrier phrase. The server system may be configured to provide the query to a different search engine system if the query is determined to not include the predefined carrier phrase. Calling the particular telephone number automatically may include presenting on the remote computing device an animated timing display and calling, by the remote computing device, the particular telephone number at substantially a termination of the animated timing display. The query may be received in response to a user-selection of a query button at the mobile computing device. The query button may cause the mobile computing device to transmit the query to the server system.

Automatically calling the telephone number may include presenting on the computing device, without receiving user-input at the computing device subsequent to receiving the telephone number, a prompt to call the telephone number. The prompt may enable a user to cause the computing device to dial the telephone number with a single-action user input. Automatically calling the telephone number may include presenting on the computing device, without receiving user-input subsequent to receiving the telephone number, an animated timing display and dialing the particular telephone number at an expiration of the animated timing display. During the presentation of the animated timing display, the computing device may not present telephone numbers that correspond to the one or more search results.

Automatically calling the telephone number may include presenting, at the computing device and concurrent with the animated timing display, a button to cancel the dialing of the particular telephone number at the expiration of the animated timing display. The computing device may be configured to present descriptions of other of the search results in response to a user-selection of the button to cancel the automatic dialing. The automatic calling of the telephone number may be performed by the computing device and may include a dialing of the telephone number by the computing device while the computing device is not presently connected to another computing device in a duplex telephone conversation. The computing device may receive user-input defining the query. The query may be provided to the server system in response to a user-selection of a query button that causes the query to be transmitted to the server system.

The system may include a search result ranker that is programmed to assign, for the most-prominently ranked of the search results, the ranking based at least in-part on comparing a present time to data that indicates hours of operation for a venue that corresponds to the most-prominently ranked of the search results. The system may include a search result ranker that is programmed to assign, for the most-prominently ranked of the search results, the ranking based at least in-part on user-input provided by multiple users, other than a user of the computing device, to cancel an automatic dialing of the telephone number. The automatic dialing of the telephone number performed by automatic callers that are each programmed to receive a particular telephone number for a most-prominently ranked of search results that are received in response to a query, and to automatically call the particular telephone number.

The system may include a search result ranker that is programmed to assign, for the most-prominently ranked of the search results, the ranking based at least in part on whether the computing device, or a user of the computing device, has previously called the telephone number. The system may include a second search engine, at the server system, that is programmed to receive the query and determine search results that are relevant to the query. The system may include a query type identifier to determine whether the query is to be provided to the particular search engine system or the second search engine system. The computing device may not automatically call a telephone number corresponding to a most-prominently ranked of search results that are received from the second search engine.

The spoken input may include a carrier phrase and a query parameter. The query parameter may be submitted to a search engine system to generate the search result information. The carrier phrase may be used to select a search engine system, from among a plurality of search engine subsystems, to which the query parameter is to be submitted. Providing an alert to the user may include providing a timed countdown, at the end of which the connecting of the user is to occur automatically. The search result information may include a telephone number that is responsive to a query parameter in the spoken input. Connecting the user to the target may include automatically dialing the telephone number using the device. The search result information may include a uniform resource locator for a web site that is responsive to a query parameter in the spoken input. Connecting the user to the target may include automatically redirecting a web-navigating application to the web site. The user may be provided with an option to cancel automatic connection to the target of the search result information. The user may be displayed, in response to receiving a user input to cancel the automatic connection, the user information responsive to the spoken input that does not correspond to the target of the search result information.

Particular embodiments can be implemented, in certain instances, to realize one or more of the following advantages. Mobile computing device users may initiate a call to a business entity without knowing a telephone number for the business entity, or in some instances a name or location of the business entity. Similarly, users may be taken to a web page in response to a voice input without having to actively select a search result from among multiple search results. A level of user-input needed to search for a business entity and telephone the business entity or go to an entity's web site may be reduced, saving user time and increasing user convenience.

An unknown telephone number may be called, or a web page whose URL is unknown may be visited, by inputting a voice query without any physical user-input, or with a minimal amount of physical user-input (where physical input is input other than spoken input, such as contacting a touchscreen or pressing physical buttons on a telephone). A propriety of a selected search result may be passively acknowledged by a user performing no actions during a calling or redirect countdown. If a user is not interested in a selected search result, canceling the call or redirection may present a list of alternative search result suggestions.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes automatic calling of telephone numbers and automatic direction to web sites that are related to internet search results. A user of a computing device may use the computing device to submit a query to a search engine system. The search engine system may determine one or more search results that are responsive to the query and provide information identifying the one or more search results to the computing device. In response to receiving the information identifying the one or more search results, the computing device may determine that a particular telephone number or web site is highly correlated to the query and one result, and may automatically initiate a call with a telephone number that corresponds to a received search result or automatically direct the user to a landing page for a received result.

Figure 1:
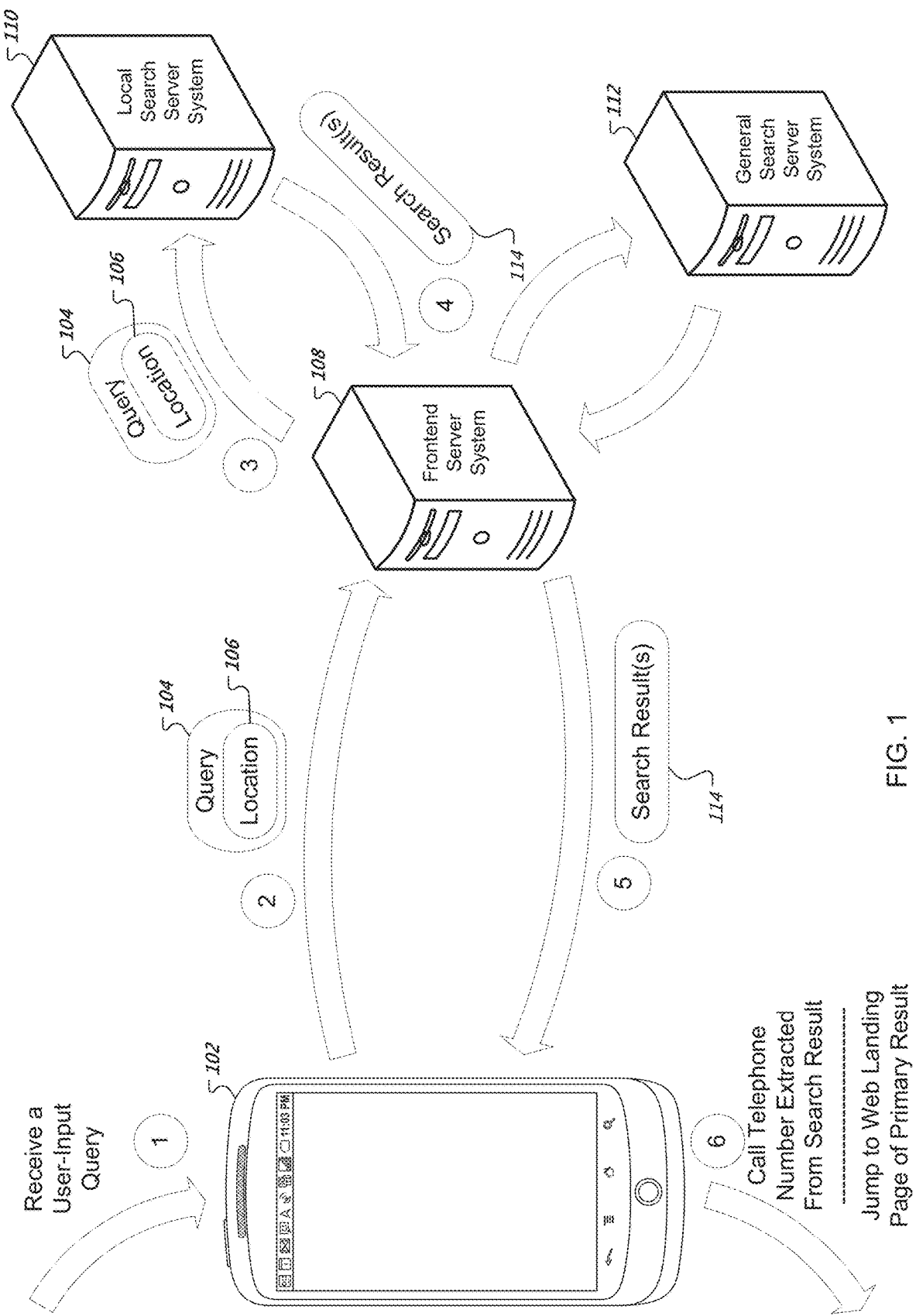
FIG. 1 illustrates a conceptual diagram of a mobile computing device automatically calling a telephone number relating to a search result, or automatically directing a browser to a web site relating to the query.

FIG. 1 illustrates a conceptual diagram of a mobile computing device automatically calling a telephone number relating to a search result, or automatically directing a browser to a web site relating to the query. As an illustration, the mobile computing device 102 may first receive a voice query from a user of the mobile computing device. For example, the user may select a "microphone" icon that is depicted on a touchscreen of the mobile telephone, and speak the phrase "Call Pizza Place." Alternatively, the user may speak "Wikipedia fast fourier transform" or "visit Wikipedia fast fourier transform." A digital representation of the spoken phrase may be stored at the mobile computing device and transmitted, as query 104 and after completion of the recording, over a network and to the frontend server system 108. An estimated geographical location 106 of the mobile computing device (e.g., latitude and longitude coordinates that are determined using signals from Global Positioning System satellites) may be sent with the query 104 in certain circumstances.

The frontend server system 108 receives the query 104 and converts the digital representation of the spoken phrase to a textual representation of the spoken phrase, for example, using a voice recognition system. The frontend server system then determines if the query 104 (now in textual form) includes a carrier phrase (e.g., one or more words) that identifies the query as designated for unique treatment. In this illustration, the query includes the carrier phrase "Call" or "Wikipedia" or "visit" as the first word of the query 104. Thus, the query is flagged for unique treatment, which may result in the query 104 being routed to a different search engine and the mobile computing device 102 automatically calling a telephone number for a search result that is responsive to the query 104.

The determination that a carrier phrase is present may be made by comparing the first word of a converted query to a whitelist of candidate carrier phrases, that are intended by the system to trigger particular actions with subsequent input provided by the user. The particular available carrier phrases may be made available to users so that they may know how best to interact with the system, though certain carrier phrases may be selected so that they are so intuitive that a user can naturally figure out how to use them without any explicit instruction. In some examples, the carrier phrases relate to particular general verb-based commands such as "call." In others, the carrier phrase can be a list of nouns, such as the names of the Fortune 500 companies, the names of the top 100 websites, and the like.

Where the query 104 is designated for unique treatment consistent with location-based search, the query 104 and the location 106 are routed to the local search engine 110 instead of the general search engine 112 (e.g., the query may not be provided to both search engines, though in other instances, it could be provided to both). In some examples, the query carrier phrase is removed from the query before providing the query to the local search engine 110. The local search engine 110 may determine search results that are responsive to both the query 104 and the location 106, and that may be geographically constrained based on the location 106. One or more of the responsive search results 114 may be provided back to the frontend server system 108, which may forward the one or more search results 114 to the mobile computing device 102. The one or more search results 114 may be ranked by their relevance to the query 104 and the location 106.

The mobile computing device 102 receives the one or more search results 114 and selects, from a most prominently ranked of the search results 114, a telephone number for the most prominently ranked of the search results. The mobile telephone automatically calls the selected telephone number, for example, by initiating a process to dial the selected telephone number. As an illustration, the mobile computing device may display the telephone number to be called and warn the user that the telephone number will be dialed if the user does not cancel the call within a determined amount of time. The display may also include a name for the corresponding search result, a physical address related the corresponding search result, or a website address related to the corresponding search result.

Where the automatic activity involves directing the user to a web page rather than dialing a telephone number, similar feedback may be provided to the user, and the user may have similar ways to deal with the feedback (e.g., to wait and let the redirection occur automatically, to cancel the redirection and do something else like look at a list of all search results, or to trigger the redirection immediately). For illustrative purposes, much of the discussion here centers on automatic dialing examples, though additional discussion is provided in places with respect to the automatic redirection examples, including FIGS. 3H and 3I below.

In another example of automatic calling, the mobile telephone 102 presents a prompt that invokes an ability of a user of the mobile computing device to dial the telephone number. As an illustration a dialog box that includes a display of the telephone number, a "Call" button, and a "Cancel" button may be presented. The telephone number, however, may not be dialed—causing the mobile computing device to connect to another computing device over the PSTN—without user-input explicitly selecting the "Call" button.

In some examples, if the query that is provided to the frontend server system 108 does not include the "Call" carrier phrase, the query is sent to the general search engine 112 instead of the local search engine 110. The general search engine 112 may return search results to the mobile telephone 102, but return of the search results may not cause the mobile telephone 102 to automatically call a telephone number. For example, a display for each of the returned search results may be presented in a list or audibly output to the user with synthesized voice. Thus, a user of the mobile telephone 102 may use a single query input mechanism (e.g., a single selectable interface element) to: (i) submit general queries that result in a visual display of a list of search results; and (ii) submit queries that invoke the mobile computing device to automatically call a telephone number for a prominently ranked search result.

In yet other implementations, a query that does not include the "call" carrier phrase can be examined in order to determine whether it should be treated as a location-based query. Various techniques may be used to make such a determination, such as by training a system with prior queries that are known to have been location-based in order to identify terms and phrases that are directed to location, and then comparing a subsequently-received query to the model that results from such training, in order to produce an indicator of whether the subsequently-received query is likely to be directed to a location. For example, terms like "food" and "restaurant" may be determined to indicate a location-based query, since they are frequently employed by users who are trying to find a place to eat in the near future in their vicinity. When such a determination is made, such queries may be treated like those that are preceded by a "call" carrier phrase discussed above.

In addition to the result of the process shown by arrow 6 in the figure being the calling of a telephone number, the result may alternatively be the jumping or redirection of an application on the device 102 to a web page that is, for example, a landing page that corresponds to a search result (i.e., the web page that is provided when a user clicks on a search result in a list of search results). For example, if the general search server system 112 determines that a particular query is highly correlated to a particular search results and/or that the "score" or other indicator of quality for the first search result is substantially higher than that for the second-best result, the general search server system 112 may cause the frontend server system to provide mark-up code to the device 102 that causes the landing page for the top result to be displayed immediately (i.e., redirects the device 102 to the landing page without displaying the search results on device 102) or causes the search results to be displayed and causes the device 102 to be automatically redirected to the landing page for the top result after a predetermined countdown time period if the user does not provide an input to stop such automatic redirection. In this way, a user can be shown the top search result and taken to it without the user having to provide any further input after submitting the query. In various examples, a particular search result may have a high score if users that view a list of search results in response to a query select the particular search result more frequently than other of the search results.

Although particular examples are shown here, of automatically dialing a telephone number responsive to a query and automatically directing a device to a landing page that is responsive to a query, other categories may also be identified using the techniques described here and may be handled automatically in similar manners. When a spoken query is received, the text for the query may be analyzed in a step-wise or hierarchical process that applies rules to the text to determine whether the query corresponds to a particular category, such as a landing page or a business telephone number. For example, a particular carrier phrase may be correlated to a particular category of results, or a proper category may be identified by checking a series of lists for a match to some text in a query, where each list corresponds to a category, and the order in which the lists are checked may be in a decreasing frequency with which each category is the subject of a spoken query.

Thus, for example, a textual representation of a spoken input may be received, and the first word or words can be checked first against a list of specific commands (e.g., "call") and if a match is found in that category, the system may execute the identified command, such as by identifying a telephone number that corresponds to the remainder of the query. If there is no matching command, the system may then check whether a particular search result has a very high score, and institute an automatic redirection of a device to the landing page for that result. Other categories may subsequently be checked, and an action can be selected that is defined for the particular category. Other such actions could be the execution of a command on a particular application on a device, such as the playing of an audio or video file with a media player, the execution of a mathematical function with a calculator, and the like.

Figure 2:
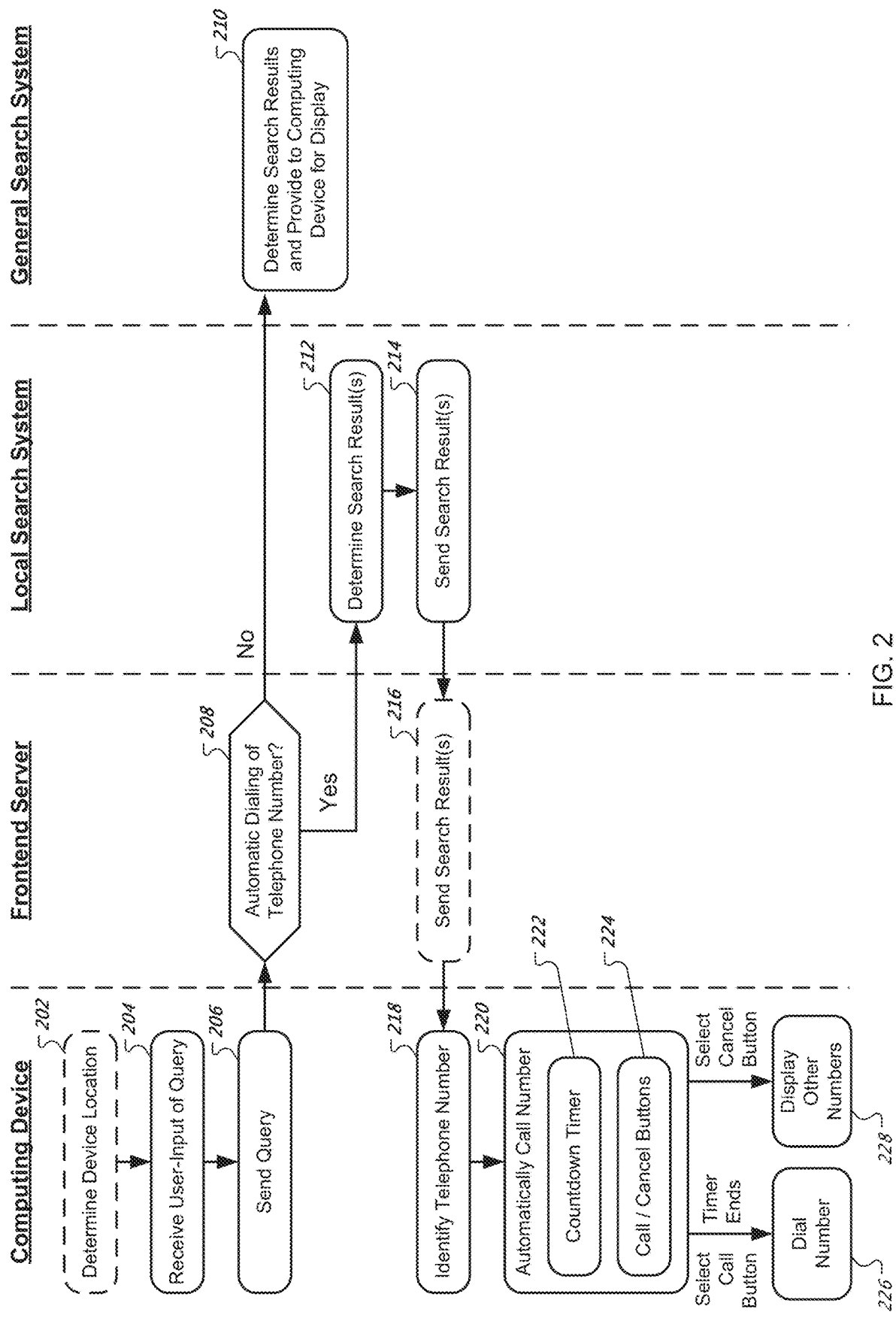
FIG. 2 is a swim lane diagram of an example process for automatically calling a telephone number for a search result.

FIG. 2 is a swim lane diagram of an example process for automatically calling a telephone number for a search result. In general, the process involves identifying a search result for a query that has associated with it a telephone number (e.g., by analyzing a home page for a result and locating a telephone number there or by keeping a structure list of telephone numbers that are correlated to particular business locations, such as by having businesses submit profile information to a service). In other examples, a business web site may be identified instead of, or in addition to, a business telephone number, and the device may be automatically directed to the web site using user interface mechanisms similar to those for automatically dialing a business. Also, the device may dial a business and show a web landing page for the business substantially simultaneously.

The process of FIG. 2 may be implemented by the systems illustrated in FIGS. 1, 6, 8, and 9, and may cause the screenshots of FIGS. 3A-5 to be generated for display on a computing device.

In box 202, a device location is optionally determined by the computing device. For example, a location-identification mechanism may identify an estimated geographical position of the computing device using wireless signals from electronic transmitters (e.g., GPS satellites or cellular towers). Triangulation methods may be employed to determine the estimated geographical position of the mobile device and an accuracy of the position determination. The estimated geographical position may be represented by latitude and longitude coordinates. In some examples, the estimated geographical position is determined based on Wi-Fi signals, or a user "check-in" to a location. In various examples, a series of estimated geographical positions are determined, and each of the positions are provided to a frontend server system as regular position updates.

In box 204, the computing device receives user-input of a query. For example, a user of the computing device may select a search box and, in response to focus being provided to the search box, type a text query into the search box using a virtual or physical keyboard. Upon entering the text query, the user may select a query button to submit the query to a server system. Alternatively, the user may select a voice query button (e.g., a virtual or physical button) that invokes the computing device to record audio with a microphone. The search box or voice query button may each allow the user to either (i) receive and display a list of search results that are responsive to the query, or (ii) automatically call a telephone number for a search result, depending on the query content (e.g., whether the query includes a carrier phrase). In various examples, the query buttons are not buttons that are used to place a telephone call (e.g., buttons that are labeled with the characters 0-9 and a "talk" button).

In some examples, the query includes a user-input location, as discussed in more detail below.

In box 206, the query is sent to the frontend server system. For example, after the user has entered a textual query, the user may select an interface element that is displayed proximate to the query box and that depicts the words "Go" or "Search." Selection of the interface element may invoke the computing device to transmit the textual query to the frontend server system. In examples where the user has recorded a voice query, upon pressing a button to terminate recording, or upon the computing device automatically ceasing to record after the user has finished speaking, data encoding the spoken voice query may be transmitted to the frontend server system. Both transmissions of the query may be performed independent of a telephone call in which two telephones are connected for duplex voice communication.

In some examples, the computing device may send the estimated geographical position of the computing device along with the query. For example, latitude and longitude coordinates may accompany the query request to the frontend server system, or the computing device may have previously provided the coordinates to the frontend server system (e.g., as a semi-regular stream of location updates). In some examples, the query that was input by the user includes geographical position information. For example, a query for the phrase "Call Pizza Places near Times Square" includes the position information "Times Square."

In box 208, the frontend server system has received the query and determines if the query is for automatically calling a telephone number of a search result. In some examples, the query is determined to be for automatic calling if the query includes a predetermined word. For example, the predetermined word may be a carrier phrase that was user input, and is inline with the rest of the words in the query. The carrier phrase may be at the beginning or end of the query. As an illustration, the queries "Call Gas Station," "Phone Pharmacy," "Mobile Phone . . . Dial . . . Nearest Bookstore," and "Large Taxi Companies Auto-Dial" all include carrier phrases (underlined in these examples).

In various examples, the query is identified as for automatic calling of a telephone number for a search result based on an indication received from the computing device. For example, the computing device may have determined that the query included a carrier phrase, removed the carrier phrase from the query, and provided, with the query and to the frontend server system, an indication that the query is for a automatic calling of a telephone number of a search result. In various examples, the query is sent to the server system in response to user selection of a graphical interface element that is specifically for submitting queries that are for automatic calling telephone numbers. In such examples, the queries may be sent to the frontend server system with an indication that the query is for automatic calling of a telephone number, or may be directed to a Uniform Resource Location address that is designated solely for receiving queries that are for automatically calling a telephone number of a search result. Thus, the server system may implicitly know that the received query is for automatic calling a telephone number.

If the query is not for automatically calling a telephone number, the query may be provided to a general search system (box 210, discussed in more detail later). If the query is determined to be for automatically calling a telephone number, the query may be provided to a local search system (also referred to as a geographical search system).

In box 212, a local search system determines search results that are responsive to the query. The local search system may a search engine is configured to provide search results that are relevant to a query that is accompanied by location information. In some examples, the location is sent along with the query as coordinates of an estimated geographical location of the computing device. In other examples, the location is determined from the content of the query. As an illustration, in the query "Call Drycleaner near my Home," the location "Home" may be identified as being location information, and a geographical location for "Home" may be determined from settings stored for the user that submitted the query.

In some examples, the local search system searches through a corpus of records that are each associated with a venue (e.g., a business entity or a place) that has a geographic position. For example, each record may be a structured set of fields and include a field for storing a location for a venue that is referenced by the record. In various examples, every record in the corpus for the local search system may include a geographical location. In some examples, each of the records is associated with a webpage that is stored and presented by a single information provider. In other words, the records may not each correspond to websites that are provided by a variety of information providers and are accessible across the internet. Search results may be constructed based on information in records.

The local search system may use the geographical location to assign a weight value to search results. For example, the search system be able to access many search results that are responsive to the query "Pizza," but may assign a greater weight value to search results that reference a location that is closer to the location provided in or with the query. In some examples, a set of search results that are weighted is selected based on the search results' referenced distance from the geographical location provided in or with the query. As an illustration, search results that reference locations that are not in a same city, or that are more than fifty miles away from the geographical location, may be excluded from the list of weighted search results.

The weight value for search results may be modified by multiple other factors (e.g., a prevalence of query terms in content that is stored for a search result, and a popularity of the search result as selected by users querying a search engine). The local search system may select a group of responsive search results based on the weight values assigned to the search results. In some examples, only search results that have corresponding telephone numbers are selected by the local search system for inclusion in the group.

Each search result may include information identifying a telephone number for a corresponding real-world venue, and any combination of (i) a name for the venue, (ii) a physical address for the venue, (iii) a description for the venue, (iv) an email address for the venue, (v) a website for the venue, and (iv) a picture of the venue.

In box 214, one or more of the search results are sent to the computing device. The search results may be sent directly to the computing device, or may be sent through the frontend server (see box 216). In some examples, a single search result that is determined to be most relevant to the query is provided to the computing device (e.g., the highest weighted search result is provided). In other examples, multiple search results may be provided to the computing device. The multiple search results may be ranked by any combination of the local search system, frontend server, or computing device. A rank may include information identifying a sequential numbering of the search results or information identifying a scoring of each of the search results.

In box 218, the computing device receives the one or more search results and identifies a telephone number that corresponds to one of the search results (e.g., the most highly ranked search result). For example, where a single search result is returned, the telephone number for the single search result is identified. In examples where multiple search results are returned, a telephone number for a most highly ranked or scored search result may be identified. In some examples all the search results that are sent to the computing device include telephone numbers. In some examples, one or more of the search results do not include telephone numbers, and the identified telephone number may for the highest ranked or scored search result that has a corresponding telephone number.

In box 220, the computing device automatically calls the identified telephone number. For example, a timer may be presented for display on the computing device (box 222). If the timer expires without the computing device receiving user-input that interrupts the process of automatically calling the identified telephone number (e.g., by selecting a "Cancel" interface element or physical button), the computing device calls the identified telephone number. In various examples, the timer counts down or up to timer expiration. In various examples, the amount of time before the timer expires varies based on scoring of the most-prominently ranked search result (e.g., an absolute value or a difference from the next-most-prominently ranked score). For example, the timer may not be displayed and the call may automatically be dialed for search results that are particularly relevant.

In box 224, the automatic calling of the telephone number includes generating for display a prompt to call the telephone number. The prompt may include a "Dial" button that, when selected, causes the computing device to call the telephone number. For example, in response to sending the query, the computing device may present a pop up box with user-selectable buttons for dialing the telephone number or for cancelling the call (e.g., removing the pop up box). In this example, the telephone may not dial the telephone number to establish voice communication without receiving user input, but may instead require explicit user-input selecting a dial button.

In various examples, automatic calling of the telephone number includes displaying, on the computing device, any combination of the telephone number, a name for a corresponding venue, and an address. In some examples, a single telephone number and information corresponding to the single telephone number are displayed on the screen of the computing device. The computing device may not, in such examples, display telephone numbers or names of other venues.

In box 226, the telephone number is dialed. The operations of box 226 may be performed if the user selected the dial button (box 224) or the timer expires without receiving user-input cancelling the call (box 222). Dialing the telephone number may include providing a series of digits (e.g., a telephone number standardized by the Telecommunication Standardization Sector (ITU-T) in the recommendation E.164) in order to establish a duplex voice communication with another computerized device. In some examples, dialing the telephone number includes connecting the computing device to another computing device over a Voice over Internet Protocol (VoIP) network.

In box 228, telephone numbers for additional search results are optionally displayed if the cancel button is selected (see box 224). Thus, if a user decides that he does not want to call a telephone number that is automatically being called, he may select the cancel button and view a list of other relevant search results. The user may select any of the search results to call the corresponding telephone number or to view additional information.

In some examples, upon selecting the cancel button, other search results are not displayed and the pop up box is removed from the display. In various examples, upon expiration of the timer, the other search results are displayed (box 228), and the user must select a "Call" button during the countdown to call the identified telephone number. Thus, the countdown may be an opt-in period for calling the telephone number. In such examples, the user may select the "Call" button before the timer expires to prevent the other search results from being displayed.

In various examples, between a time when the computing device provides the search query to the server system and a time when the telephone number is dialed by the computing device, no additional user input is received at the computing device. In various examples, between a time when the computing device receives the one or more search results from the server system and a time when the telephone number is dialed, no additional user input is received.

Now returning to a discussion of box 210, if the query is determined to not be for automatically calling a telephone number of a search result, the query may be provided to a general search system (in distinction to the local search system), and the general search system may determine responsive search results. The general search engine system query a corpus of records for documents that may not all have associated geographical locations. In various examples, the general search engine system provides search results that are particular to multiple types of media (e.g., videos, pictures, and products).

Although not illustrated in the swim-line diagram of FIG. 2, the search results that are determined by the general search system may be provided to the computing device for display. In response to receiving multiple search results from the general search system, the computing device may display, in visual depiction of multiple search results, content for multiple search results and may not initiate a process to call a telephone number for any of the multiple search results. Indeed, one or more of the multiple search results may not include a telephone number (in contrast to the search results provided by the local search system, which may all include telephone numbers). In other words, a query that is determined to be for automatically calling a telephone number may cause the computing device to initiate a telephone call to a single telephone number, while a query that is determined to not be for automatically calling a telephone number may cause the computing device to display a visual list of multiple search results.

The operations performed by the methods of FIG. 2 reference a query that is passed from the computing device to the frontend server and to the local search system. In some examples, the query may change as it is passed between these computing devices. For example, the query that is transmitted to the frontend server system may be a digital representation of audio that includes a carrier phrase and query terms, the frontend server may transform the digital representation of audio into textual alphanumeric words that include the carrier phrase and the query terms, and the local search system may receive a textual query that includes the query terms with the carrier phrase removed. This document may refer to these multiple representations as simply a "query." Additionally, and for clarity in the description, this document discusses both the transmission and display of "search results," even through a transmitted search result includes computer-readable data that is in a digitally encoded format, while a display of a search result includes a visual depiction of the data on a screen.

In various examples, the boxes 218-226 are performed by a server system calling service (e.g., GOOGLE VOICE). In other words, the computing device may send a query for processing by a server system, and the server system may send the identified telephone number to the calling service. The calling service may initiate the telephone call between the computing device and a device that corresponds to the identified telephone number.

In various examples, the concepts described in this document in relation to automatically calling telephone numbers may be applied to other forms of communication. These other forms of communication include email, text messaging, voicemail messages, instant messaging, and VoIP calls. For example, a user querying "Email High School" may see an email application program invoked on a computing device, where a message has been generated and preaddressed to an email address for a particular school, as determined to be by a search system. Thus, a query and a location may be transmitted from a computing device to a remote server system, which returns to the computing device email addresses for one or more search results. The computing device may generate an email composition window where the email is preaddressed to the most-highly ranked search result.

In various examples, the email may include content from the query. For example, the query "Email High School Message John Doe will be late for class today," may result in the computing device composing an email message that is addressed to an email address for a particular high school, and includes as the subject or body of the email the content "John Doe will be late for class today."

In various examples, the email may be automatically transmitted either immediately or upon expiration of a visually depicted timer. In various examples, a prompt similar to the prompt in FIG. 3D may be displayed, requesting user input before a message that is addressed to the particular high school is composed. Similar operations are performed for the text messaging form of communication, for example, in response to a user stating "Text Pizza Place Message Large Sausage Pizza to Como Park ASAP."

In various examples, a query that is directed to any of the various forms of communication may include the computing device searching for local search results. For example, a query for "Phone John's Bike Shop" may include first searching a list of contacts that are stored for the user of the computing device to see if any of the contacts are named "John's Bike Shop." In some examples, a search result that is identified by a remote server system may be more highly ranked if the search result is related to a contact that is stored for the user of the computing device (e.g., if the search result and a contact that is stored for the user may share a telephone number or physical address).

Figure 3B:
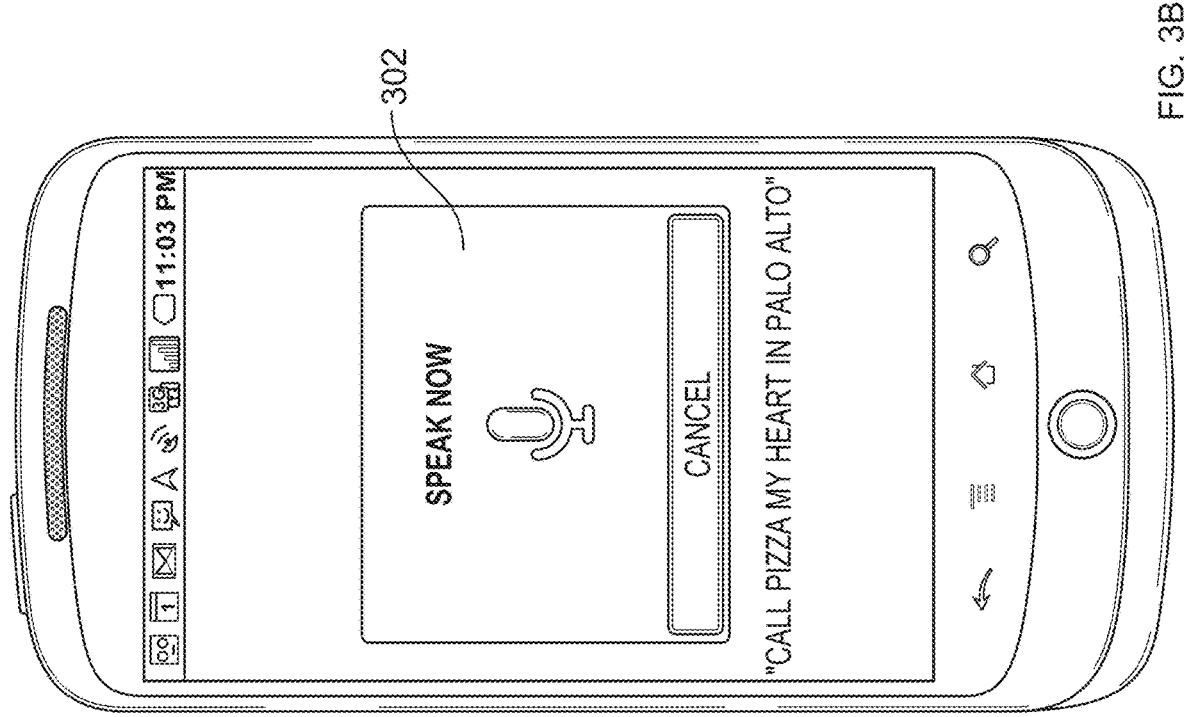
FIGS. 3A-F are example screenshots displayed in a process for automatically calling a search result.
Figure 3A:
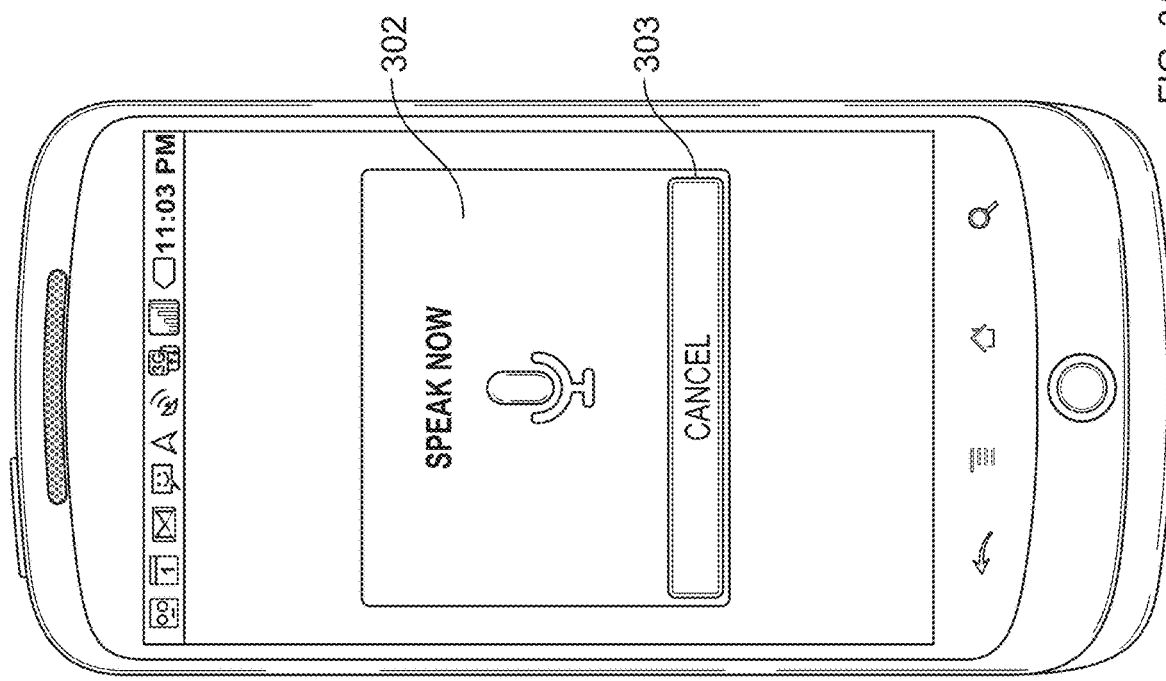

FIGS. 3A-F are example screenshots displayed in a process for automatically calling a search result. The dialog box 302 that is illustrated in FIG. 3A may be presented with user interface content displayed in the background (e.g., the region surrounding the dialog box 302). The dialog box 302 may be displayed in response to user selection of an icon for initiating a voice query. The screenshot displayed in FIG. 3B illustrates that the user has stated "call pizza my heart in palo alto" (this text may not be displayed on the computing device screen, however, as the user speaks).

Figure 3D:
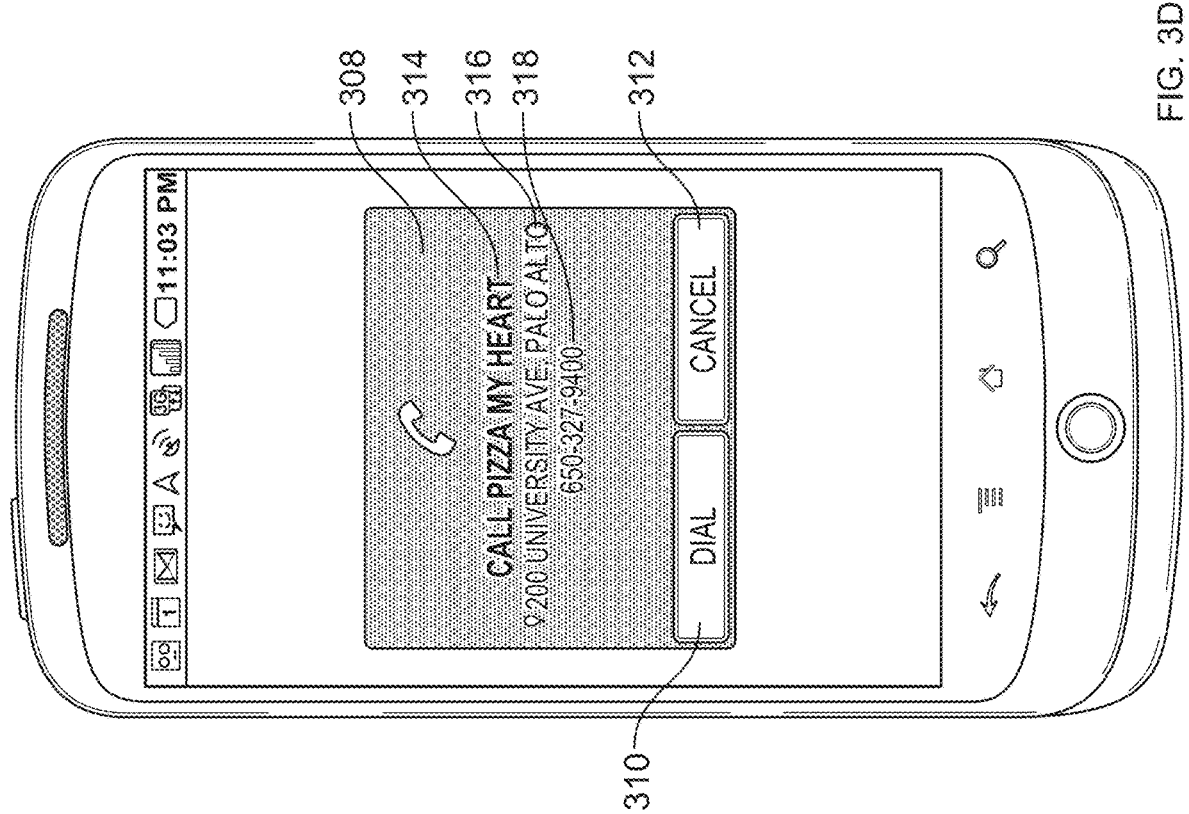
Figure 3C:
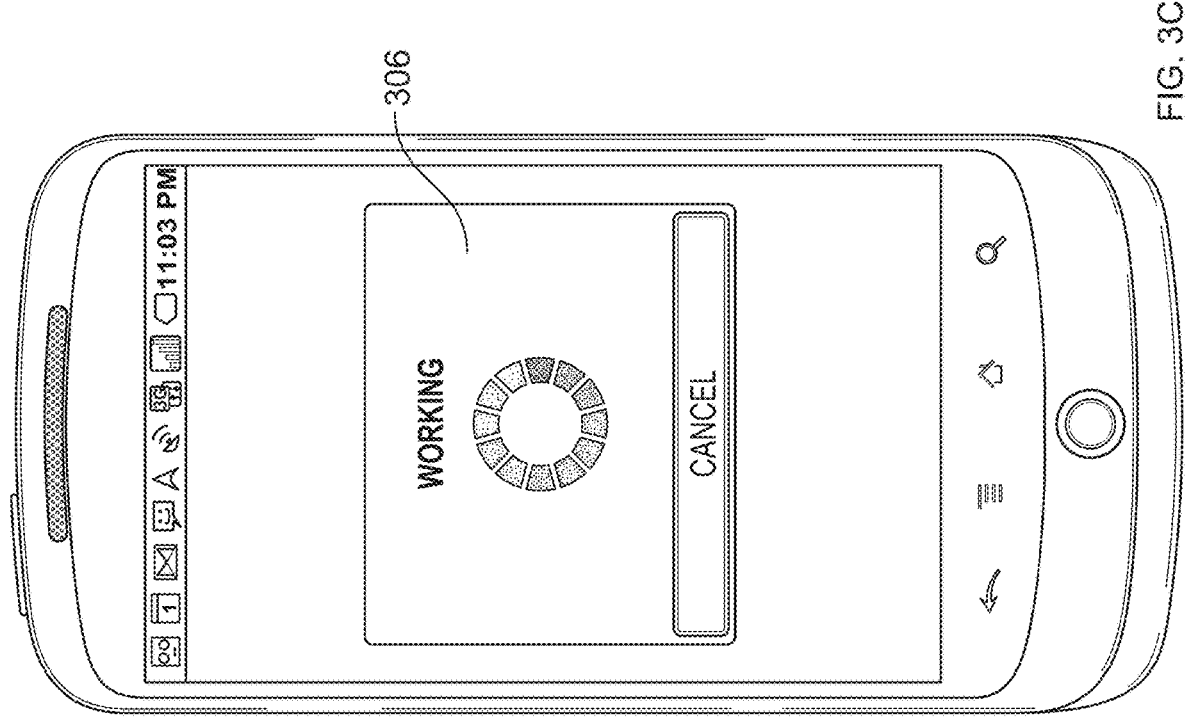

FIG. 3C illustrates a "working" dialog box 306 that may be presented in response to receiving the user's spoken query. In various examples, the "working" dialog box 306 is presented after the computing device has sent the query to the server system and while the computing device is awaiting one or more responsive search queries.

FIG. 3D illustrates a dialog box 308 that is presented on the computing device once a search result has been received at the computing device as responsive to the voice query. The dialog box 308 may present information for a single search result (e.g., the search result that is the most relevant to the query). As illustrated in FIG. 3D, the user may select the "Dial" interface element 310 to dial the telephone number for the "Pizza My Heart" restaurant that is located in Palo Alto. Also, the user may select the "Cancel" interface element 312 to remove the dialog box 308 from display. The dialog box 308 includes search result content, for example, a search result name 314, a search result address 316, and a search result telephone number 318. In various examples, the dialog box 308 is static and the user must press the dial button 310 in order to call the telephone number 318.

Figure 3E:
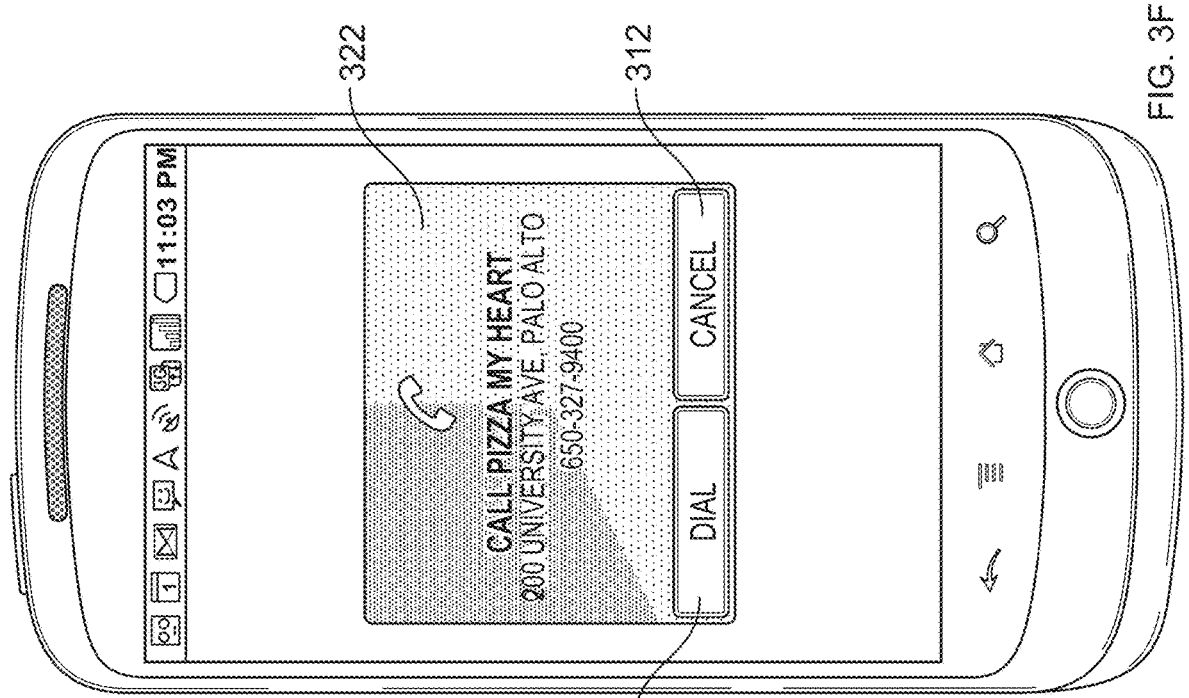
Figure 3F:
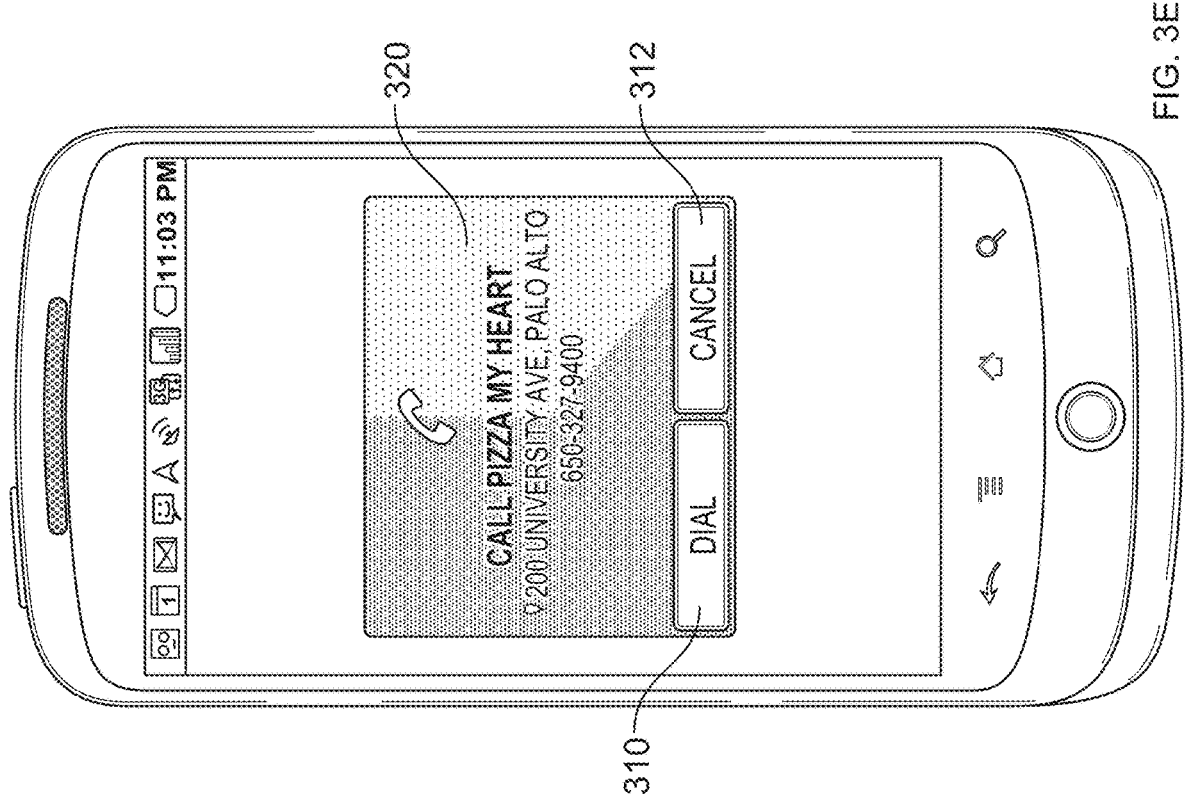

FIGS. 3E and 3F illustrate dialog boxes 320 and 322 in which the telephone number "650-327-9400" will be dialed by the computing device if the user does not select the cancel interface element 312 within a determined amount of time. In this example, an animated countdown timer illustrates an amount of time that is left until the telephone number will be dialed by sweeping the dialog box with a new color in a clockwise motion. When the timer terminates (e.g., when the screen is fully filled with the color and the animation terminates or it is apparent to a user that the timer has completed) the computing device dials the telephone number.

Figure 3G:
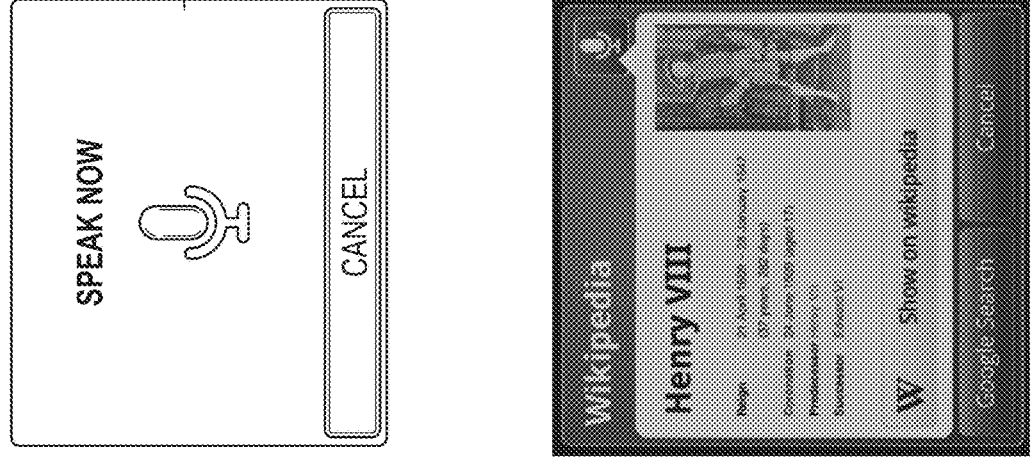
FIGS. 3G-3H are screenshots of processes for automatically redirecting a user of a computing device in response to spoken submission of a query.
Figure 3H:
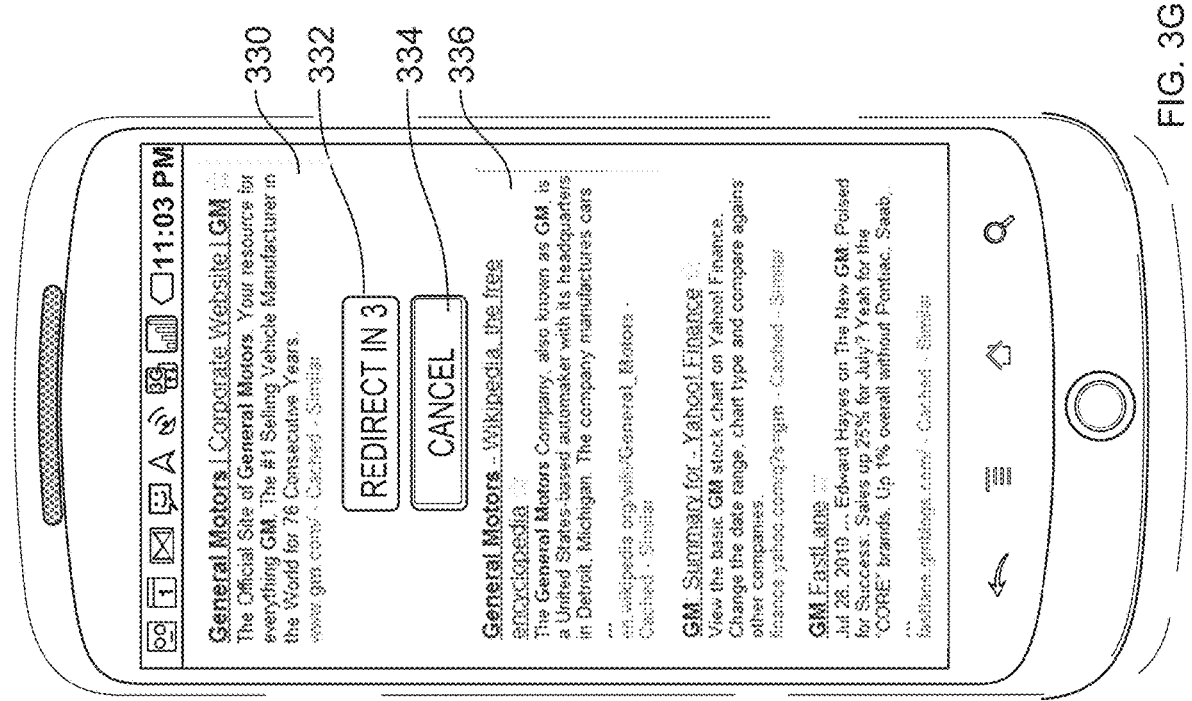

FIGS. 3G-3H are screenshots of processes for automatically redirecting a user of a computing device in response to spoken submission of a query. In FIG. 3G, a display of a list of search results is shown on a device. In this example, the user has spoken the term "general motors" into the device as a query, and the listed results are the results that were determined to be most responsive to the query. A first result 330 is a link to the General Motors Corporation web site. It is a fairly dead on match for the query, and the system that served the results may have determined that it is a high-quality result via various mechanisms. For example, the system may have observed that other users who previously submitted the query or similar queries frequently (a high percentage of the time relative to other results) clicked on the result. The system may also have recognized that the query was navigational in character, and thus aimed at finding a particular site, as opposed to finding a general answer to a question. In addition, the system may notice that the URL for the site correlates closely to the query, and thus makes it more likely that the site is an intended destination for the user. Other results, such as result 336 were determined to be less relevant by the system.

The search system, which may be a server system remote from the device, may thus have returned the results along with code to permit an automatic redirection of the device to the General Motors landing page. That code is reflected in the figure by two user interface elements 332 and 334. First, a countdown alert box 332 is shown, and alerts the user that the device will be redirected to the landing page in X seconds (where the number changes downward each second until the redirection occurs). The alert box 332 may not be selectable by the user. Second, a cancel control 334 is provided in the form of a user-selectable button. If the user selects the control 334 before the countdown ends, both UI elements 332 and 334 may be removed from the display, and the search results will collapse around the area formerly occupied by the elements, so that the user will be able to see more of the search results. Also, the first result may optionally be removed from the display, if it is believed to be fair to assume that the user's action cancelling the redirection indicates a disinterest in the first result. The user could achieve a similar result simply by saying the word "cancel," so that all of the options here could be made available in a hands-free, voice-only environment.

The user may also choose to be taken to the first result by clicking on the link for the first result, in a typical manner, and thus need not wait for the countdown. However, the countdown may provide an advantage of taking the user directly to the landing page without requiring manual input from the user, while still allowing the user to opt out of the automatic redirection. In various examples, the mobile telephone may not be visible to the user. Thus, the countdown may be audibly output, for example, by the mobile telephone stating with synthesized voice "Redirecting you to the 'General Motors Corporate Website,' say 'Cancel' to instead hear a list of search results."

FIG. 3H shows successive displays relating to automatic redirection to a web site using, at least in part, a carrier phrase that identifies the web site. Display 340 shows an on-screen display and a simultaneous query spoken by a user of a mobile computing device. The query includes a carrier phrase, which identifies a web site to be directed to, and a parameter, which is the thing that is to be searched at that site. A user may have instituted the action here by pressing a search button on the device and then pressing a microphone button to indicate an intent to enter data by speaking rather than by typing.

Display 342 shows the direct result returned by the system in response to the spoken input, without having first returned a list of search results to the user. Specifically, the system recognized (e.g., by making a comparison to a whitelist of terms) that the first word of the spoken query was a reserved carrier phrase for a category relating to automatic redirection to web sites. The Wikipedia site would have been on that list because it is a very popular site, particular for users who have queries to obtain information on the web. Here, the content is summarized content from a landing page, and a selectable button is displayed so that the user can be taken to the actual landing page if they want more information. The summarized content, in certain instances, can be generated by applying a template to the particular page. In this example, many Wikipedia pages follow a common format, so that the system may be programmed to extract particular content from the Wikipedia page in order to produce the summarized information. In other instances, the layout of a page may be analyzed by a system (e.g., by looking at the document object model organization and/or at the values of particular HTML tags for a page), and the formatted information may be generated by applying various rules to such information rather than applying a template.

Figure 4:
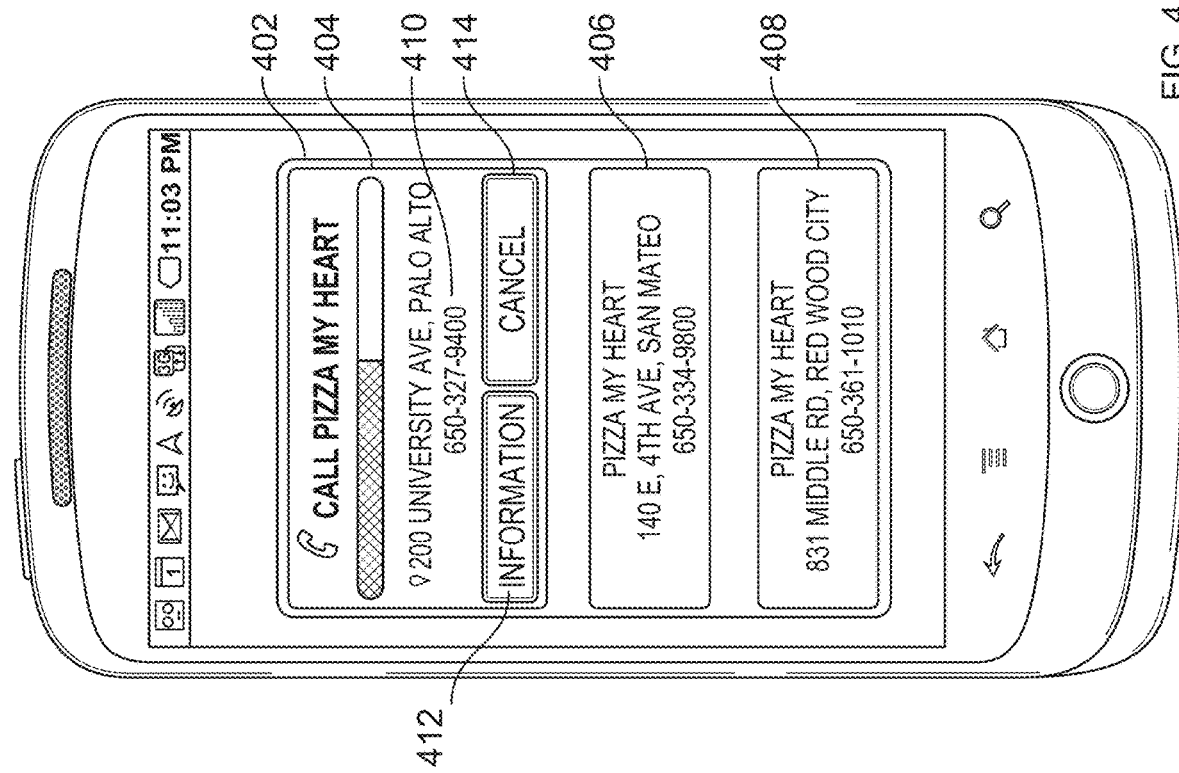
FIG. 4 is a screenshot displayed in a process for automatically calling a search result.

FIG. 4 is a screenshot displayed in a process for automatically calling a search result. In particular, the dialog box 402 may be displayed in response to the computing device receiving search results that are responsive to a query. The dialog box 402 displays information about three search results 404, 406, and 408. In this illustration, the search result 404 for the "Pizza My Heart" restaurant in Palo Alto is determined by the computing device to be a most prominently ranked of the search results 404, 406, and 408. Thus, a process of automatically calling the Palo Alto Pizza My Heart Restaurant has been initiated. Specifically, the animated timer 410 is filling in a left-to-right direction. Substantially around a time that the timer 410 completely fills, the telephone number 410 will be dialed.

The search result 404 includes an information interface element 412 and a cancel interface element 414. Selection of the information interface element 412 may pause or terminate the calling of the restaurant, and cause the computing device to display additional content about the restaurant (e.g., any combination of pictures, a map of the location, hours of operation, and an email address). Selection of the cancel button 414 may cause the search result 404 to disappear from the display or collapse to a display that is similar to search results 406 and 408.

User selection of the search results 406 or 408 while the timer 404 is counting and the search result 404 is expanded may cause additional information to display for the search result that is selected. In some examples, the search result 404 collapses and the selected search result expands. The expanded search result may appear similar to the display of search result 404, but may or may not include a timer that counts towards a dialing of a telephone number.

Figure 5:
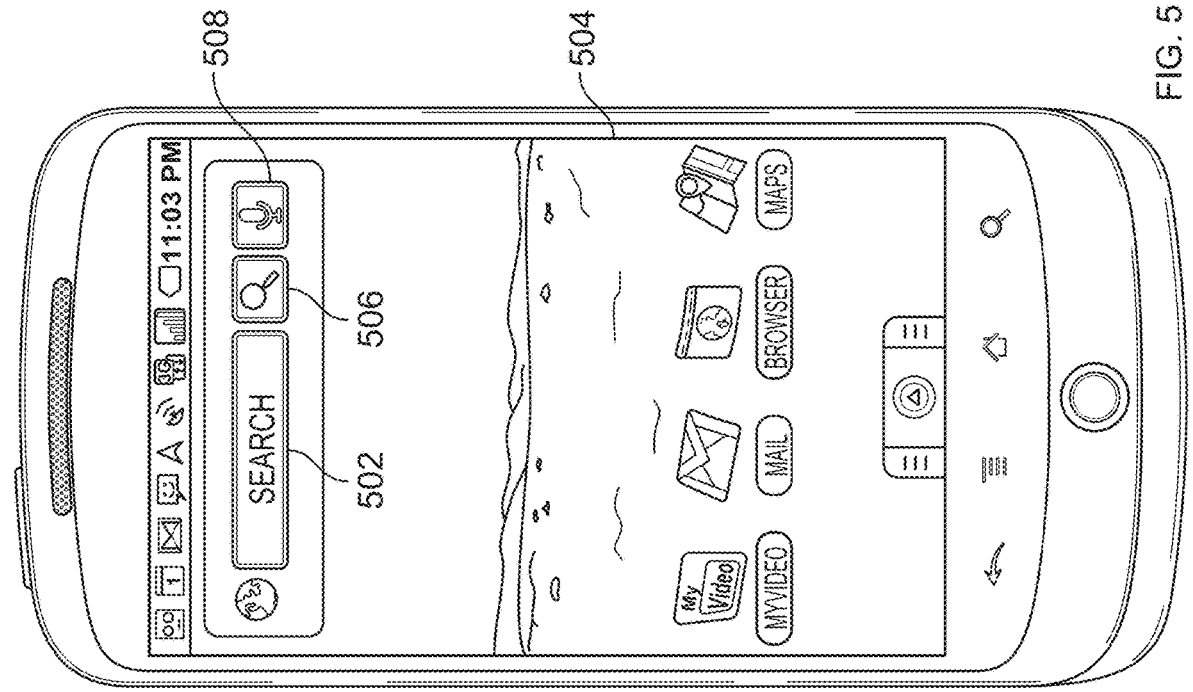
FIG. 5 is a screenshot of a user interface that enables a user to submit a query.

FIG. 5 is a screenshot of a user interface that enables a user to submit a query. The user interface includes a search query box 502. User-selection of the search query box 502 may enable the user to type a textual query into the box. In some examples, selection of the box 502 causes a virtual keyboard to appear for display on the screen 504. Upon entering the textual query, the user may select the search button 506. Selection of the search button 506 may cause the computing device to transmit the textual query to a remote server system.

The user interface also includes a voice query button 508. User-selection of the voice query button 508 may cause the dialog box 302 (FIG. 3A) to appear overlaid the interface displayed in FIG. 5. In some examples, the dialog box 302 receives focus. A user may not be able to interact with the graphical interface depicted in FIG. 5 unless the cancel button 303 is selected.

Figure 6:
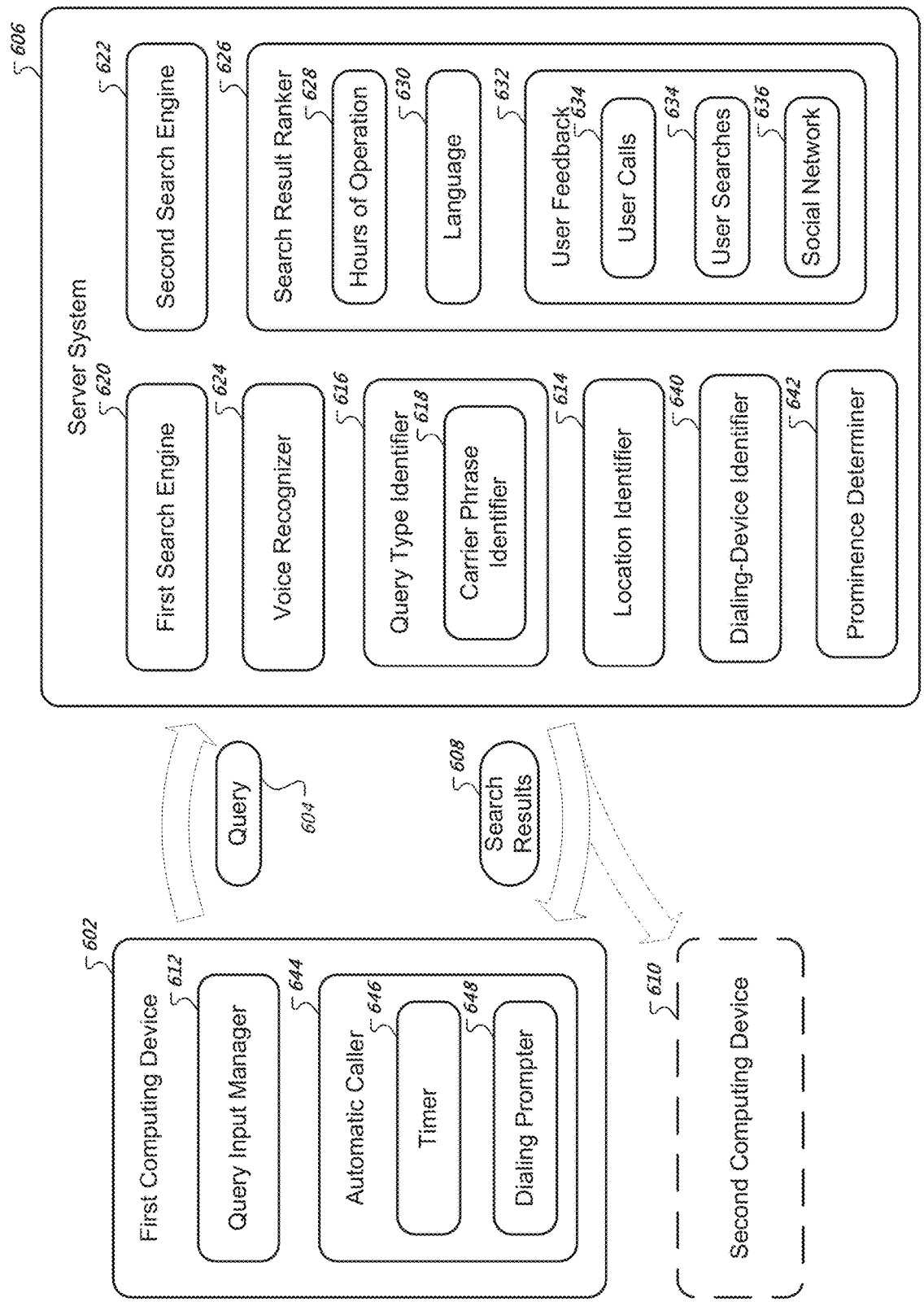
FIG. 6 is a block diagram of an example system for automatically calling a telephone number for a search result.

FIG. 6 is a block diagram of an example system for automatically calling a telephone number for a search result. The system includes a first computing device 602 that provides a query 604 to a server system 606. In response, the server system 606 returns search results 608 to the first computing device 602 or a second computing device 610.

In more detail, the first computing device 602 includes a query manager 612. The query manager 612 performs operations for receiving a query and transmitting the received query to the server system 606. For example, the query manager 612 may cause the search query box 502 and the voice query button 508 to display on the mobile device. The query manager 612 may receive text or vocal user-input and transmit a query based on the received input to the server system 606.

The server system 606 includes a location identifier 614. The location identifier 614 identifies a location of interest for the received query 604. The location identifier 614 can perform this identification by determining words in the query 604 that correspond to a location. Location identifier 614 can additionally or alternatively identify a location of interest for the received query 604 by identifying an estimated geographical location of the first computing device 602, as determined by the first computing device 602 and transmitted to the server system 606.

The voice recognizer 624 receives digital information that represents recorded audio, and converts the digital information to a textual query. For example, the query 604 may represent an audio recording of a voice of a user of the first computing device 602. The voice recognizer 624 may translate the audio recording into a probabilistically determined textual representation of the user's voice.

The server system 606 includes a query type identifier 616. The query type identifier 616 determines whether the query is of a type that is to cause a computing device to automatically call a telephone number for a search result, or of a type that is to cause the computing device to not automatically call a telephone number and instead display search results. In some examples, a query that is to cause a computing device to automatically dial a telephone number is provided to a first search engine 620, while other queries are sent to a second search engine 622.

An example component for determining the type of query is a carrier phrase identifier 618. The carrier phrase identifier 618 determines whether or not the receive query 604 includes a carrier phrase. For example, and as described in greater detail above, the carrier phrase identifier may determine if the first word of the query includes the word "Call." In some instances, the carrier phrase identifier 618 does not identify a query as including a carrier phrase if the query corresponds to a venue name, even though the query includes the word "Call." For example, a query of "Call that Computer Guy" may be identified by the query type identifier 616 as a query for a computer-repair business that is named "Call that Computer Guy," and not a query that causes a mobile computing device to automatically call a telephone number.

The query is sent to either the first search engine 620 or the second search engine 622, based on the type of query as determined by the query type identifier 616. The first search engine 620 may be a local search engine 620 that receives the query and a location, and returns search results that are responsive to the query. The responsive search results may be determined by weighting multiple signals, as described in more detail below. Generally, a local search engine 620 may constrain the results so that the search results that are displayed to a user are within a determined geographical distance of the location identified by the location identifier 614. In other words, a query for "Call Palo Alto Pizza Places" may not return a search result for a pizza place in Minnesota because Minnesota is farther than an example distance of fifty miles.

The second search engine 622 may be a general content search engine. A general content search engine may return results that are relevant to the location identified by the location identifier 614, but the results may not be constrained to a geography. For example, a query for "Pizza Places" when the first computing device 602 is in Palo Alto may return search results that correspond to web pages for: (i) a human resources department for a national pizza place, (ii) a pizza place in Minnesota that has been in the news recently, and (iii) a pizza place that is close to the estimated geographical location of the first computing device 602. Thus, the search results may not be constrained to a location. Further, the second search engine 622 may return search results that correspond to web pages that are hosted by various information providers, while the first search engine may return search results that correspond to web pages that are stored by a single information provider (e.g., web pages in a directory of "venues" that each have a corresponding geographical location).

The search result ranker 626 may rank search results based on various signals 628-636. The operations of the search result ranker 626 may be performed by: (i) the first search engine 620 (e.g., a local search engine), (ii) the server system 606 on search results that are returned by the first search engine 620, or (iii) by the first computing device 602.

For example, the server system 606 may receive from the first search engine 620 a list of search results that are each associated with various scores (e.g., based on distance and content). The search result ranker 626 may revise these scores based on the signals 628-636.

The hours of operation signal 628 may be used by the search result ranker 626 to more heavily weight those search results that include information that indicates that a corresponding venue is presently open for business. For example, should an individual query "Call Pizza Place" at 1:30 in the morning, the search result ranker may more heavily weight search results for those businesses that are presently open. Thus, the mobile computing device 602 may be more likely to automatically call a telephone number for a business where an individual will answer the telephone.

The language signal 630 may be used by the search result ranker 626 to more heavily weight those search results that correspond to a language of the query 604. A language of search results may be determined by the content of text associated with the search result (e.g., the text of a webpage or a description for a venue that corresponds to the search result). Also, one or more of the search results may have information that identifies a language that is spoken by individuals that answer telephone calls to a telephone number that corresponds to the search result. For example, a search result may be generated based on a computer record for a venue. The record may store information indicating that the languages "English" and "French" are spoken by individuals that answer the telephone. Thus, the search result may not be scored as high for a query that includes content in Spanish as for a query that includes content in English or French.

User feedback information 632 may also be used by the search result ranker 626 to modify scores for search results. For example, a user calls signal 634 may modify a score for a search result based on user call data for search results. For example, as users of mobile computing devices submit queries that cause the mobile computing devices to automatically call telephone numbers (e.g., as described in this document), the search results that correspond to telephone numbers that are successfully dialed may be weighted more heavily than telephone numbers that are not successfully dialed (e.g., because users selected a "cancel" button during the automatic calling process instead of letting a timer expire or selecting a "dial" button). The scores may be modified based on calls by either a user of the first computing device 602, or based on calls by users of multiple other computing devices.

In some examples, scores for search results are modified based on a user-supplied correction to the automatic calling process. For example, a user may query "Call Pizza Place" when the user is located in Palo Alto. The user's mobile telephone may automatically call Pizza My Heart, but the user may terminate the automatic call (e.g., by selecting a "cancel" button). In response the user may either: (i) enter a new query (e.g., "Call Frank's Pizza"), or (ii) select to call a telephone number for a "Frank's Pizza" search result that is displayed in response to selecting the "cancel" button. The search result corresponding to the next dialed telephone number may be more heavily weighted for the original "Call Pizza Place" query.

In various examples, scores for search results are modified based on user-initiated telephone calls in response to a query that is independent of an automatic calling process. For example, a user may query "Pizza Places" and be presented with a list of search results for web pages of various pizza place related content. Next to one of the search results may be a link to dial a telephone number. User-selection of this link may cause the search result to be more heavily favored in subsequent queries that cause an automatic calling process to occur—even though the search result may not have been displayed in response to a query that caused an automatic calling process.

A user searches signal 636 may cause the search result ranker 626 to score more heavily search results that are selected in response to user searches. Continuing the above example where the user queried "Pizza Places," the user may select multiple of the search results to view the corresponding web pages for the search results (in some examples, without selecting to call any telephone numbers). These search results, or content identified within the search results, may be weighted more heavily than other search results in response to a query that is for automatically calling a telephone number. For example, if a displayed list of search results includes two search results for different Palo Alto pizza places, and the user selects the search result for one of the local pizza places, a user that later queries "Call Pizza" while in Palo Alto may see his telephone automatically call the telephone number for the selected search result (the search result scores otherwise being equal).

A social network signal 638 may cause the search result ranker 626 to weight the user feedback 632 based on social network data. Social network data may include a social network graph that identifies: (i) individuals that have an acquaintance relationship, and (ii) a strength of the relationship. For example, an acquaintance relationship may be formed if a user "friends" or "follows" another user on a social network. An acquaintance relationship may also be formed if a user is in another user's electronic address book, or if one user calls or emails the other user. The strength of the relationship between users may be based on a type of communication between the users, and a frequency of the communication. A social network "distance" between two users may be based on how far apart the users are in the social network graph (e.g., are the users "friends" or "friends of friends"), and a strength of the connecting relationships.

The social network data 638 may be used to weight more heavily the user feedback 632 that is performed by users in a social network that are closer to a querying user. For example, data by the querying user's "friends" may be weighted the most heavily, while data by the querying users' "friends of friends of friends" may be weighted less heavily. Thus, if many of the querying user's friends have queried "Call Frank's Pizza," the querying user may be more likely to see his telephone automatically call Frank's Pizza than Pizza My Heart in response to a "Call Pizza" query (the scores for each respective search result otherwise being equal).

The dialing-device identifier 640 identifies the computing device that is to automatically call the telephone number. The dialing-device identifier 614 may look at settings that are stored for a first computing device 602, or may look at the content of the query 604. As an illustration, suppose that an individual uses a laptop computer to log into a search engine with a user account, and has indicated in settings for the search engine that the user account is associated with a telephone number for a mobile telephone. The user may type the query "Call Pizza Place" into a search box for the search engine, and press the enter button. The query may be sent to a server system, and the server system may determine a most relevant search result for the query. The laptop may not be able to call telephone numbers, or the user may prefer telephone calls on his mobile telephone, and thus the call may be completed using the mobile telephone (e.g., the second computing device 610).

For example, the server system may send information to the mobile telephone 610 that causes the mobile telephone 610 to automatically call the telephone number for the most relevant search result. For example, the mobile telephone may display one of various combinations of the screenshots in FIGS. 3D-4. The display may be accompanied by an alert (e.g., the telephone ringing). In various examples, the server system initiates a call between the mobile telephone 610 and the telephone number for the search result. In such examples, the screenshots in FIGS. 3D-4 are not displayed and the phone rings as normal. Upon answering the telephone, a user may hear the other side ring, or may hear a voice prompt (e.g., saying "Connecting you to Frank's Pizza Place").

In various examples, the server system or the first computing device 602 includes a prominence determiner 642. The prominence determiner may determined how strong a score for a most prominent search result is in comparison to the next most prominent search results. If the most prominent search result is above a threshold, or differs by a determined percentage or score, the telephone number for the most prominent search result may be automatically called. If the most prominent search result has a score that is close to the score for the other search results, the search results may be provided in a list for selection by a user of the mobile telephone 602 (and the most prominent search result may not be automatically called). For example, a query for "Call Pizza My Heart" may be more likely to result in automatic calling than a query for "Call Pizza." Thus, users may be less likely to have their computing devices automatically call telephone numbers when the corresponding search result is not scored significantly higher than alternative search results.

The first computing device 602 may include an automatic caller 644. The automatic caller 644 may receive a single search result and institute a process for automatically calling a telephone number for the single search result, or alternatively, receive multiple search results and institute a process for automatically calling a telephone number for a most-prominently ranked of the multiple search results. The automatic caller 644 may include an timer 646 that institutes a delay until a telephone number is dialed by the first computing device 602. The timer 646 may provide a visual depiction, for example, an animated sequence that illustrates time remaining until the timer expires and the telephone number is dialed. The automatic caller may also include a dialing prompter 648. The dialing prompter 648 may display a prompt, where the displayed prompt is associated with functions that allow a user of the first computing device 602 to dial a telephone number with a single-action user-input.

In some examples, the described communications between the first computing device 602 and the server system 606 are performed as data transfers over the internet. Thus, the communications may not occur during a duplex voice communication over the public switched telephone network. The server system may transmit the search results as non-voice alphanumeric data. Accordingly, the server system may not transmit voice data to the first computing device 602 in response to receiving the query 604. Indeed, in implementations where a text query is entered and the textual query is transmitted to the server system, no voice data may be exchanged between the first computing device 602 and the server system 606 between and including the sending of the query and the return of the search results.

In some examples, the timer 646 is local to the first computing device 602 and the server system 606 does not providing the timing for the automatic calling. Thus, the server system 606 may provide one or more search results 608 to the first computing device 602, but may not be aware of a status of the automatic calling by the first computing device 602 (e.g., a termination of the timer, a dialing of the telephone number, or a canceling of the automatic calling).

Figure 7:
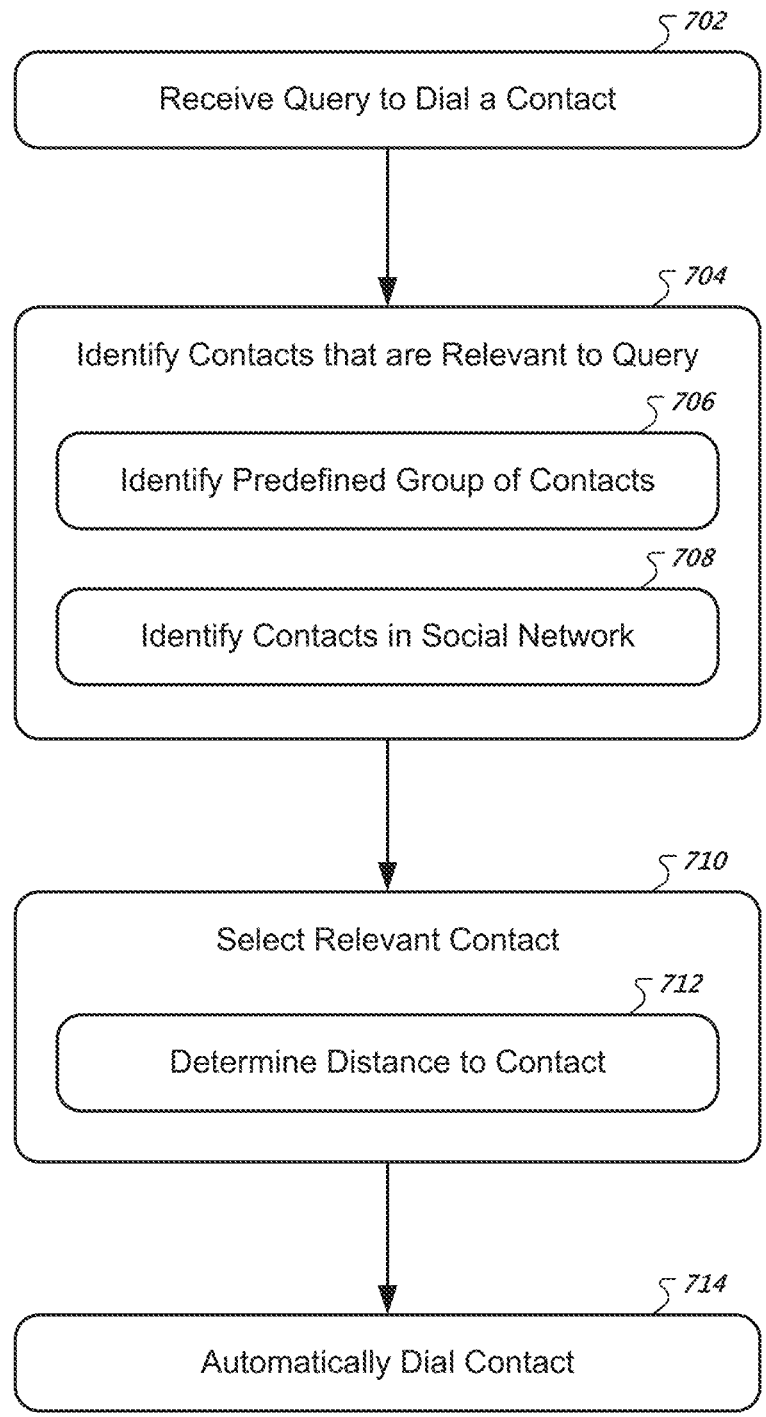
FIG. 7 is a flowchart of an example process for automatic calling of a social contact.
Figure 8:
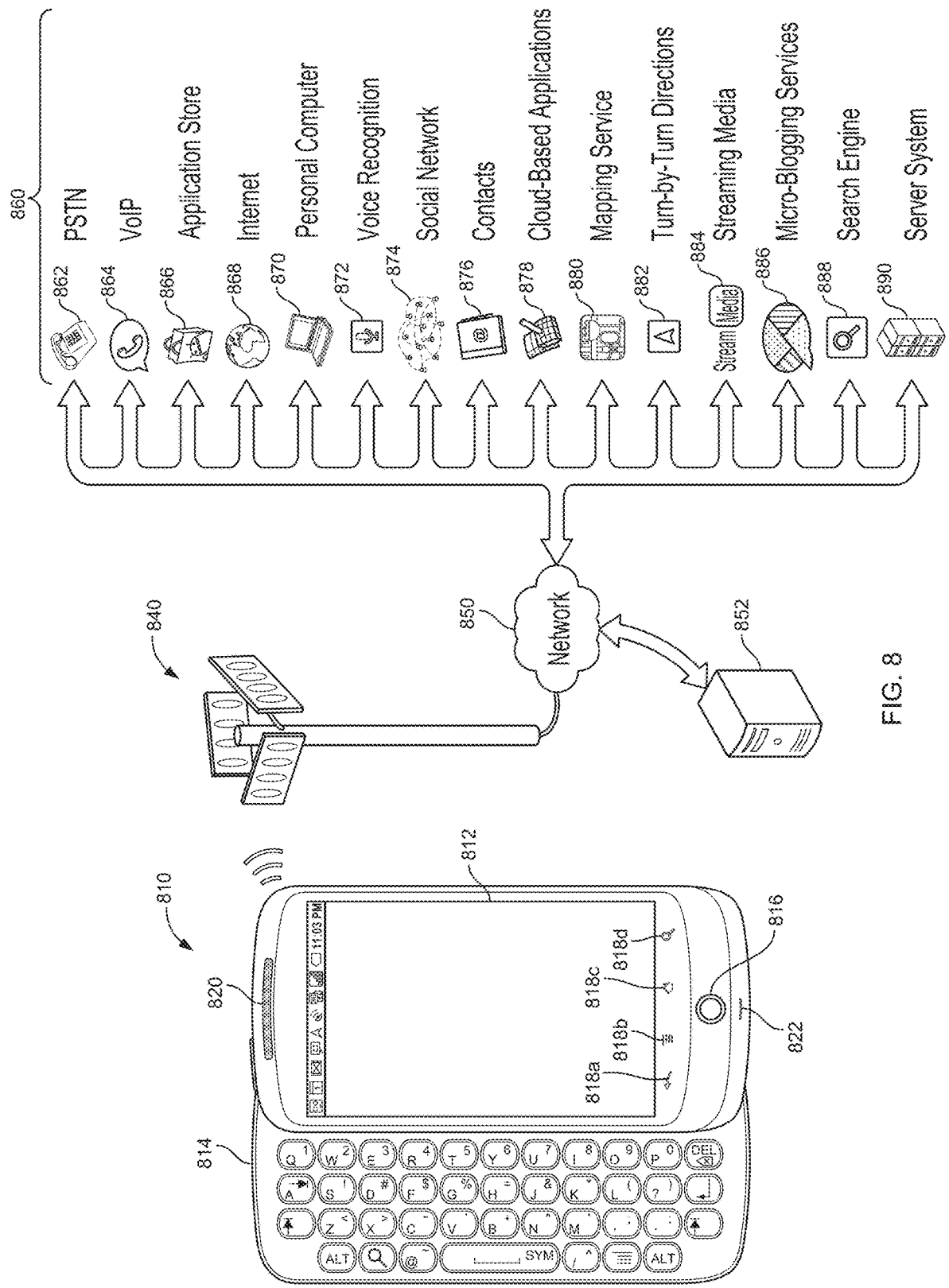
FIG. 8 is a conceptual diagram of a system that may be used to implement the systems and methods described in this document

FIG. 7 is a flowchart of an example process for automatic calling of a social contact. In box 702, a query is received to dial a contact. As an illustration, a police officer on duty may need immediate assistance and press a voice query input button on a mobile computing device and state "Connect to Nearest Officer." In another illustration, a golf course groundskeeper may need help moving an object and may press a button on a mobile computing device that is associated with connecting the groundskeeper to a nearest other worker on the golf course. The queries may be input into the mobile computing device, transmitted to a server system, and received by the server system.

In box 704, contacts that are relevant to the query are identified. The identification may include determining a type of the query, for example, by identifying a carrier phrase in the query. In the above illustration of the police officer, the phrase "Connect to" may be a carrier phrase that identifies an action that is to be performed for an identified contact. Example other carrier phrases may include "Leave Message For," "Alert," and "Send Text Message To."

In box 706, a predefined group of contacts is identified. In some examples, the predefined group of contacts is identified as a part of the query that accompanies the carrier phrase. Thus, in the query "Call Least Busy Maintenance Worker," the group of contacts may be identified by the words "Maintenance Worker." The group of individuals associated with the group "Maintenance Worker" may be predefined. For example, dozens of maintenance workers for a university may carry mobile computing devices with them, and may be logged into user accounts with a messaging application. The maintenance workers may each have selected to be associated with a group that is named "Maintenance Worker" or that is associated with a query for the word "Maintenance Worker."

In box 708, contacts in a social network are identified. For example, in the query "Call closest social network friend," the individuals that have a friend relationship in a social network with the querying user may be identified. As another example, a query for "Connect to closest social network relation" may cause an identification of individuals that are related (e.g., such individuals may have a friend or a friend of a friend relationship with the querying individual).

In box 710, a relevant contact is selected. The contact may be selected from the identified contacts. In some examples, the type of contact selected is based on a definition that is included in the query. For example, the query "Call Closest Maintenance Worker" includes the definition "Closest." Thus, the relevant Maintenance Worker is the Maintenance worker that is the closest. A proximity of the closest maintenance worker may be performed by a server system calculating a distance between the estimated geographical location of the querying device (as uploaded to the server system) and the estimated geographical locations of the devices for the maintenance workers (as uploaded to the server systems periodically).

In other examples, the type of contact is not specified in the query. For example, the type of contact may be pre-associated with the carrier phrase (e.g., a "Call Maintenance Worker" query may automatically call the closest maintenance worker. In other examples, an indication of the type of contact is sent with the query (e.g., a "Call Closest Maintenance Worker" button may be pressed at the mobile computing device and a signal indicating that the closest maintenance worker is to be selected may be transmitted to a server system).

In box 712, the selection of the relevant contact includes determining a distance to a contact. For example, the server system may compute the distance between an estimated geographical location of a querying computing device and each estimated geographical location for a device that is assigned to the identified group (e.g., each maintenance worker's mobile computing device). In these examples, the estimated geographical locations may not be fixed locations for venues, but coordinates for computing devices that move over time. The most relevant contact may be selected as the contact that is associated with the computing device that is closest to the querying computing device.

In box 714, the selected contact is automatically called. The automatic calling may be performed as described above with reference to FIGS. 1, 3D-3F, and 6. In various examples, the prompt for the contact that is being automatically called may show the distance to the contact.

Accordingly, an individual may automatically telephone an individual that is selected from one or more predetermined groups by specifying the group and optionally a definition of the individual to be selected. The server system may determine a contact that is responsive to the query and may automatically call the contact.

Figure 9:
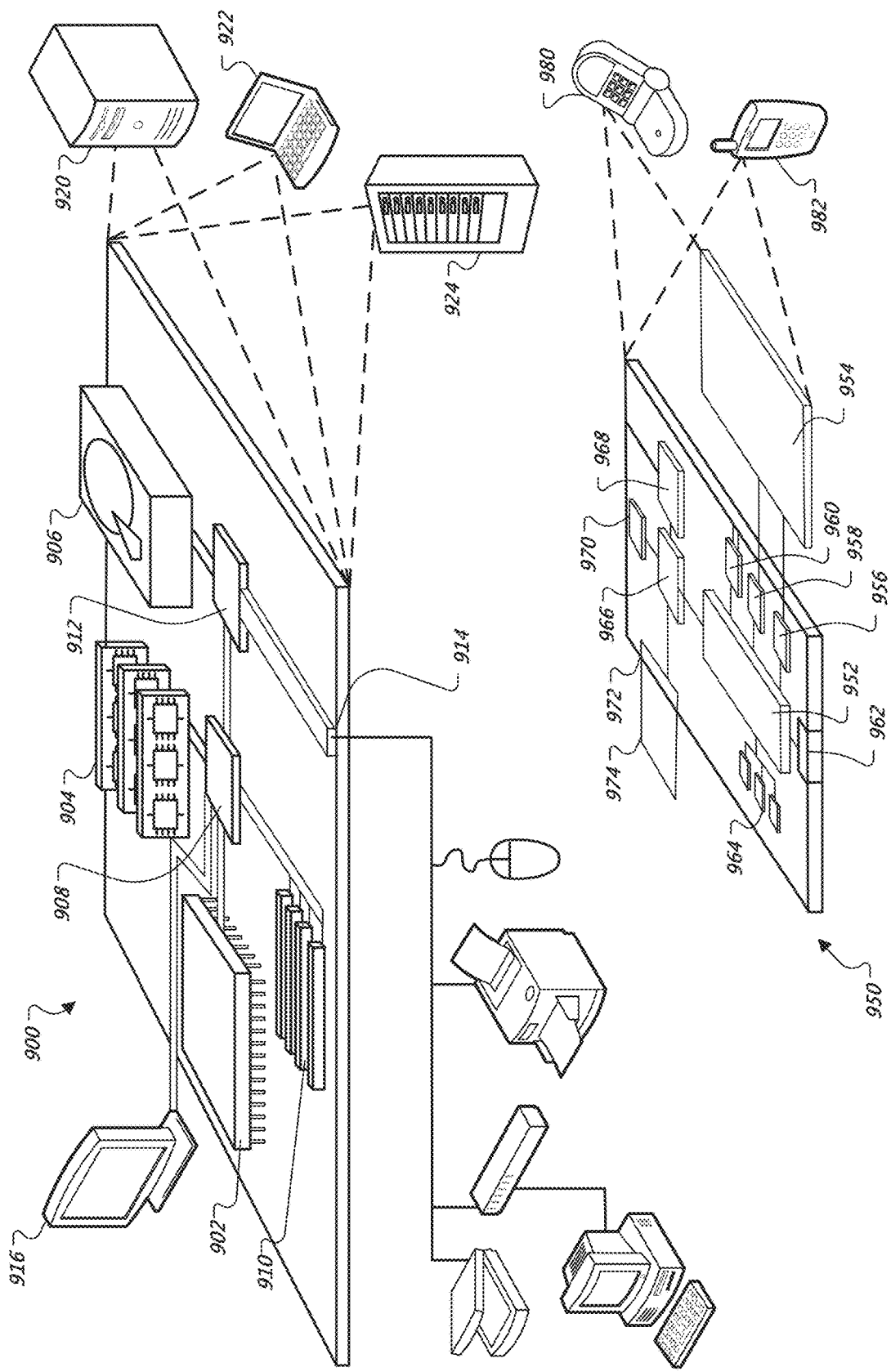
FIG. 9 is a block diagram of computing devices that may be used to implement the systems and methods described in this document, as either a client or as a server or plurality of servers.

Referring now to FIG. 9, a conceptual diagram of a system that may be used to implement the systems and methods described in this document is illustrated. Mobile computing device 910 can wirelessly communicate with base station 940, which can provide the mobile computing device wireless access to numerous services 960 through a network 950.

In this illustration, the mobile computing device 910 is depicted as a handheld mobile telephone (e.g., a smartphone or an application telephone) that includes a touchscreen display device 912 for presenting content to a user of the mobile computing device 910. The mobile computing device 910 includes various input devices (e.g., keyboard 914 and touchscreen display device 912) for receiving user-input that influences the operation of the mobile computing device 910. In further implementations, the mobile computing device 910 may be a laptop computer, a tablet computer, a personal digital assistant, an embedded system (e.g., a car navigation system), a desktop computer, or a computerized workstation.

The mobile computing device 910 may include various visual, auditory, and tactile user-output mechanisms. An example visual output mechanism is display device 912, which can visually display video, graphics, images, and text that combine to provide a visible user interface. For example, the display device 912 may be a 3.7 inch AMO-LED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 912). Further, the mobile computing device 910 may include one or more speakers 920 that convert an electrical signal into sound, for example, music, an audible alert, or voice of an individual in a telephone call.

An example mechanism for receiving user-input includes keyboard 914, which may be a full qwerty keyboard or a traditional keypad that includes keys for the digits '0-9', '*', and '#.' The keyboard 914 receives input when a user physically contacts or depresses a keyboard key. User manipulation of a trackball 916 or interaction with a trackpad enables the user to supply directional and rate of rotation information to the mobile computing device 910 (e.g., to manipulate a position of a cursor on the display device 912).

The mobile computing device 910 may be able to determine a position of physical contact with the touchscreen display device 912 (e.g., a position of contact by a finger or a stylus). Using the touchscreen 912, various "virtual" input mechanisms may be produced, where a user interacts with a graphical user interface element depicted on the touchscreen 912 by contacting the graphical user interface element. An example of a "virtual" input mechanism is a "software keyboard," where a keyboard is displayed on the touchscreen and a user selects keys by pressing a region of the touchscreen 912 that corresponds to each key.

The mobile computing device 910 may include mechanical or touch sensitive buttons 918a-d. Additionally, the mobile computing device may include buttons for adjusting volume output by the one or more speakers 920, and a button for turning the mobile computing device on or off. A microphone 922 allows the mobile computing device 910 to convert audible sounds into an electrical signal that may be digitally encoded and stored in computer-readable memory, or transmitted to another computing device. The mobile computing device 910 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 910 may present a graphical user interface with the touchscreen 912. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 904. User-selection of the button may invoke the pre-defined action.

In some examples, the operating system provides a "desktop" user interface that is displayed upon turning on the mobile computing device 910, activating the mobile computing device 910 from a sleep state, upon "unlocking" the mobile computing device 910, or upon receiving user-selection of the "home" button 918c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 910 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 912 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. Unlike an application program, which may not be invoked until a user selects a corresponding icon, a widget's application program may start with the mobile telephone. Further, a widget may not take focus of the full display. Instead, a widget may only "own" a small portion of the desktop, displaying content and receiving touchscreen user-input within the portion of the desktop.

The mobile computing device 910 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 910 may include other application modules and hardware. A call handling unit may receive an indication of an incoming telephone call and provide a user capabilities to answer the incoming telephone call. A media player may allow a user to listen to music or play movies that are stored in local memory of the mobile computing device 910. The mobile telephone 910 may include a digital camera sensor, and corresponding image and video capture and editing software. An internet browser may enable the user to view content from a web page by typing in an addresses corresponding to the web page or selecting a link to the web page.

The mobile computing device 910 may include an antenna to wirelessly communicate information with the base station 940. The base station 940 may be one of many base stations in a collection of base stations (e.g., a mobile telephone cellular network) that enables the mobile computing device 910 to maintain communication with a network 950 as the mobile computing device is geographically moved. The computing device 910 may alternatively or additionally communicate with the network 950 through a Wi-Fi router or a wired connection (e.g., Ethernet, USB, or FIREWIRE). The computing device 910 may also wirelessly communicate with other computing devices using BLUETOOTH protocols, or may employ an ad-hoc wireless network.

A service provider that operates the network of base stations may connect the mobile computing device 910 to the network 950 to enable communication between the mobile computing device 910 and other computerized devices that provide services 960. Although the services 960 may be provided over different networks (e.g., the service provider's internal network, the Public Switched Telephone Network, and the Internet), network 950 is illustrated as a single network. The service provider may operate a server system 952 that routes information packets and voice data between the mobile computing device 910 and computing devices associated with the services 960.

The network 950 may connect the mobile computing device 910 to the Public Switched Telephone Network (PSTN) 962 in order to establish voice or fax communication between the mobile computing device 910 and another computing device. For example, the service provider server system 952 may receive an indication from the PSTN 962 of an incoming call for the mobile computing device 910. Conversely, the mobile computing device 910 may send a communication to the service provider server system 952 initiating a telephone call with a telephone number that is associated with a device accessible through the PSTN 962.

The network 950 may connect the mobile computing device 910 with a Voice over Internet Protocol (VoIP) service 964 that routes voice communications over an IP network, as opposed to the PSTN. For example, a user of the mobile computing device 910 may invoke a VoIP application and initiate a call using the program. The service provider server system 952 may forward voice data from the call to a VoIP service, which may route the call over the internet to a corresponding computing device, potentially using the PSTN for a final leg of the connection.

An application store 966 may provide a user of the mobile computing device 910 the ability to browse a list of remotely stored application programs that the user may download over the network 950 and install on the mobile computing device 910. The application store 966 may serve as a repository of applications developed by third-party application developers. An application program that is installed on the mobile computing device 910 may be able to communicate over the network 950 with server systems that are designated for the application program. For example, a VoIP application program may be downloaded from the Application Store 966, enabling the user to communicate with the VoIP service 964.

The mobile computing device 910 may access content on the internet 968 through network 950. For example, a user of the mobile computing device 910 may invoke a web browser application that requests data from remote computing devices that are accessible at designated universal resource locations. In various examples, some of the services 960 are accessible over the internet.

The mobile computing device may communicate with a personal computer 970. For example, the personal computer 970 may be the home computer for a user of the mobile computing device 910. Thus, the user may be able to stream media from his personal computer 970. The user may also view the file structure of his personal computer 970, and transmit selected documents between the computerized devices.

A voice recognition service 972 may receive voice communication data recorded with the mobile computing device's microphone 922, and translate the voice communication into corresponding textual data. In some examples, the translated text is provided to a search engine as a web query, and responsive search engine search results are transmitted to the mobile computing device 910.

The mobile computing device 910 may communicate with a social network 974. The social network may include numerous members, some of which have agreed to be related as acquaintances. Application programs on the mobile computing device 910 may access the social network 974 to retrieve information based on the acquaintances of the user of the mobile computing device. For example, an "address book" application program may retrieve telephone numbers for the user's acquaintances. In various examples, content may be delivered to the mobile computing device 910 based on social network distances from the user to other members. For example, advertisement and news article content may be selected for the user based on a level of interaction with such content by members that are "close" to the user (e.g., members that are "friends" or "friends of friends").

The mobile computing device 910 may access a personal set of contacts 976 through network 950. Each contact may identify an individual and include information about that individual (e.g., a phone number, an email address, and a birthday). Because the set of contacts is hosted remotely to the mobile computing device 910, the user may access and maintain the contacts 976 across several devices as a common set of contacts.

The mobile computing device 910 may access cloud-based application programs 978. Cloud-computing provides application programs (e.g., a word processor or an email program) that are hosted remotely from the mobile computing device 910, and may be accessed by the device 910 using a web browser or a dedicated program. Example cloud-based application programs include GOOGLE DOCS word processor and spreadsheet service, GOOGLE GMAIL webmail service, and PICASA picture manager.

Mapping service 980 can provide the mobile computing device 910 with street maps, route planning information, and satellite images. An example mapping service is GOOGLE MAPS. The mapping service 980 may also receive queries and return location-specific results. For example, the mobile computing device 910 may send an estimated location of the mobile computing device and a user-entered query for "pizza places" to the mapping service 980. The mapping service 980 may return a street map with "markers" superimposed on the map that identify geographical locations of nearby "pizza places."

Turn-by-turn service 982 may provide the mobile computing device 910 with turn-by-turn directions to a user-supplied destination. For example, the turn-by-turn service 982 may stream to device 910 a street-level view of an estimated location of the device, along with data for providing audio commands and superimposing arrows that direct a user of the device 910 to the destination.

Various forms of streaming media 984 may be requested by the mobile computing device 910. For example, computing device 910 may request a stream for a pre-recorded video file, a live television program, or a live radio program. Example services that provide streaming media include YOUTUBE and PANDORA.

A micro-blogging service 986 may receive from the mobile computing device 910 a user-input post that does not identify recipients of the post. The micro-blogging service 986 may disseminate the post to other members of the micro-blogging service 986 that agreed to subscribe to the user.

A search engine 988 may receive user-entered textual or verbal queries from the mobile computing device 910, determine a set of internet-accessible documents that are responsive to the query, and provide to the device 910 information to display a list of search results for the responsive documents. In examples where a verbal query is received, the voice recognition service 972 may translate the received audio into a textual query that is sent to the search engine.

These and other services may be implemented in a server system 990. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network, but may not include the second device receiving the data. Conversely, "receiving" from a first device may include receiving the data from a network, but may not include the first device transmitting the data.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
   receiving, at a computing device, a spoken query by a user of the computing device;
   obtaining, by the computing device, a list of search results that are relevant to the spoken query, each search result comprising a corresponding telephone number and a corresponding score indicating a quality of the search result;
   determining, by the computing device, whether a first score for a first search result having the highest score of the list of search results exceeds a second score for a second search result having a next highest score of the list of search results by a threshold difference; and
   when the first score for the first search result exceeds the second score for the second search result by the threshold difference, calling, by the computing device, the telephone number that corresponds to the first search result automatically without any additional inputs from the user after receiving the spoken query and without calling any of the other telephone numbers that correspond to the other search results in the list of search results,
   wherein calling the telephone number that corresponds to the first search result automatically comprises presenting a user interface element that, when selected with user input, causes a cancellation of the automatic calling of the telephone number.

2. The method of claim 1, further comprising, when the first score for the first search result exceeds the second score for the second search result by the threshold difference, displaying, by the computing device, a name for the corresponding first search result and the telephone number that corresponds to the first search result.

3. The method of claim 1, further comprising, when the first score for the first search result does not exceed the second score for the second search result by the threshold difference:
   displaying the list of search results on the computing device;
   receiving, by the computing device, a user input that selects one of the search results displayed on the computing device; and
   in response to receiving the user input, calling, by the computing device, the telephone number that corresponds to the selected search result.

4. The method of claim 3, wherein displaying the list of search results on the computing device comprises displaying, for each search result of the list of search results, at least one of a name for the corresponding search result or the phone number that corresponds to the search result.

5. The method of claim 3, further comprising:
   ranking, by the computing device, the list of search results by assigning a ranking to each search result based on the score that corresponds to the search result, the first search result having the highest score of the list of search results comprising a highest assigned ranking and a last search result having the lowest score of the list of search results comprising a lowest assigned ranking,
   wherein displaying the list of search results comprises displaying the list of search results in an arrangement that is ordered according to the ranking of the list of search results.

6. The method of claim 5, wherein assigning the ranking to each search result comprises assigning a highest ranking to the first search result comprising the highest score of the list of search results and assigning a lowest ranking to a last search result comprising the lowest score of the list of search results.

7. The method of claim 1, wherein the spoken query comprises a carrier phrase that includes the word "call" or "phone".

8. The method of claim 1, further comprising:
   determining, by the computing device, that the spoken query includes a carrier phrase that identifies that the spoken query is for causing the computing device to call the telephone number automatically; and
   in response to determining that the spoken query includes the carrier phrase, designating, by the computing device, the spoken query for causing the computing device to call the telephone number automatically.

9. The method of claim 1, wherein calling the telephone number that corresponds to the first search result automatically comprises presenting, by the computing device, a prompt enabling dialing of the telephone number, to an exclusion of other telephone numbers, with a single-action user input.

10. The method of claim 1, wherein calling the telephone number that corresponds to the first result automatically comprises dialing the phone number without receipt of user input that selects the telephone number for calling.

11. A computing device comprising:
   a processor; and
   memory hardware in communication with the processor and storing instructions, that when executed by the processor, cause the processor to perform operations comprising:
      receiving a spoken query by a user of the computing device;
      obtaining a list of search results that are relevant to the spoken query, each search result comprising a corresponding telephone number and a corresponding score indicating a quality of the search result;
      determining whether a first score for a first search result having the highest score of the list of search results exceeds a second score for a second search result having a next highest score of the list of search results by a threshold difference; and
      when the first score for the first search result exceeds the second score for the second search result by the threshold difference, calling the telephone number that corresponds to the first search result automatically without receiving any additional input from the user subsequent to receiving the spoken query and without calling any of the other telephone numbers that correspond to the other search results in the list of search results,
   wherein calling the telephone number that corresponds to the first search result automatically comprises presenting a user interface element that, when selected with user input, causes a cancellation of the automatic calling of the telephone number.

12. The computing device of claim 11, wherein the operations further comprise, when the first score for the first search result exceeds the second score for the second search result by the threshold difference, displaying a name for the corresponding first search result and the telephone number that corresponds to the first search result on the computing device.

13. The computing device of claim 11, wherein the operations further comprise, when the first score for the first search result does not exceed the second score for the second search result by the threshold difference:
   displaying the list of search results on the computing device;
   receiving a user input that selects one of the search results displayed on the computing device; and
   in response to receiving the user input, calling the telephone number that corresponds to the selected search result.

14. The computing device of claim 13, wherein displaying the list of search results on the computing device comprises displaying, for each search result of the list of search results, at least one of a name for the corresponding search result or the phone number that corresponds to the search result.

15. The computing device of claim 13, wherein the operations further comprise:
   ranking the list of search results by assigning a ranking to each search result based on the score that corresponds to the search result, the first search result having the highest score of the list of search results comprising a highest assigned ranking and a last search result having the lowest score of the list of search results comprising a lowest assigned ranking,
   wherein displaying the list of search results comprises displaying the list of search results in an arrangement that is ordered according to the ranking of the list of search results.

16. The computing device of claim 15, wherein assigning the ranking to each search result comprises assigning a highest ranking to the first search result comprising the highest score of the list of search results and assigning a lowest ranking to a last search result comprising the lowest score of the list of search results.

17. The computing device of claim 11, wherein the spoken query comprises a carrier phrase that includes the word "call" or "phone".

18. The computing device of claim 11, wherein the operations further comprise:
- determining that the spoken query includes a carrier phrase that identifies that the spoken query is for causing the computing device to call the telephone number automatically; and
- in response to determining that the spoken query includes the carrier phrase, designating the spoken query for causing the computing device to call the telephone number automatically.

19. The computing device of claim 11, wherein calling the telephone number that corresponds to the first search result automatically comprises presenting a prompt enabling dialing of the telephone number, to an exclusion of other telephone numbers, with a single-action user input.

20. The computing device of claim 11, wherein calling the telephone number that corresponds to the first result automatically comprises dialing the phone number without receipt of user input that selects the telephone number for calling.

\* \* \* \* \*